United States Patent
Chow et al.

(10) Patent No.: US 9,696,566 B2
(45) Date of Patent: Jul. 4, 2017

(54) SPECTACLE WITH INVISIBLE OPTICS

(71) Applicant: Kopin Corporation, Westborough, MA (US)

(72) Inventors: Kenney W. Y. Chow, North Point (HK); Kenneth A. Kokinakis, Naples, FL (US); John C. C. Fan, Brookline, MA (US); Declan Halpin, New Bedford, MA (US); Lee A. Kuczewski, Brooklyn, NY (US); Ernesto Carlos Martinez Villalpando, Shrewsbury, MA (US)

(73) Assignee: Kopin Corporation, Westborough, MA (US)

( * ) Notice: Subject to any disclaimer, the term of this patent is extended or adjusted under 35 U.S.C. 154(b) by 53 days.

(21) Appl. No.: 14/541,662

(22) Filed: Nov. 14, 2014

(65) Prior Publication Data

US 2015/0301360 A1    Oct. 22, 2015

Related U.S. Application Data

(63) Continuation-in-part of application No. 14/101,864, filed on Dec. 10, 2013.

(Continued)

(51) Int. Cl.
  *G02C 11/00*   (2006.01)
  *G02C 5/04*    (2006.01)
  *G02C 5/22*    (2006.01)

(52) U.S. Cl.
  CPC ............... *G02C 11/10* (2013.01); *G02C 5/04* (2013.01); *G02C 5/2263* (2013.01)

(58) Field of Classification Search
  CPC ........ G02C 11/10; G02C 5/04; G02C 5/2263; G02C 9/00; G02C 9/02; G02C 5/00;
  (Continued)

(56) References Cited

U.S. PATENT DOCUMENTS 4,704,000 A * 11/1987 Pekar ................... G02C 7/14
                                                     351/158
4,865,438 A *  9/1989 Wada ................. G02B 7/002
                                                     351/158

(Continued)

FOREIGN PATENT DOCUMENTS

CN    201628821     10/2010
DE   202012003317    8/2012
(Continued)

OTHER PUBLICATIONS

International Search Report and Written Opinion of the International Searching Authority for Int'l Application No. PCT/US2015/060579, entitled "Spectacle With Invisible Optics", dated Mar. 21, 2016.

(Continued)

*Primary Examiner* — Ricky Mack
*Assistant Examiner* — Kristina Deherrera
(74) *Attorney, Agent, or Firm* — Hamilton, Brook, Smith & Reynolds, P.C.

(57) ABSTRACT

A wearable electronic display that includes an eyewear frame having a first side frame portion. A display module with a micro-display for generating images can be mounted to the first side frame portion. The display module can have an elongate portion with an image exit window positioned for directing viewable images to a user's eye.

20 Claims, 32 Drawing Sheets

Related U.S. Application Data

(60) Provisional application No. 61/736,867, filed on Dec. 13, 2012, provisional application No. 61/773,035, filed on Mar. 5, 2013.

(58) Field of Classification Search
CPC ............ G02C 2200/04; G02C 2200/06; G02C 2200/22; G02B 27/01
USPC .................. 351/158; 359/631–632; 345/7–8; 348/113–120
See application file for complete search history.

(56) References Cited

U.S. PATENT DOCUMENTS

| | | | |
|---|---|---|---|
| 4,986,649 A | 1/1991 | Smith | |
| 5,892,564 A | 4/1999 | Rahn | |
| D432,508 S | 10/2000 | Park et al. | |
| D628,616 S | 12/2010 | Yuan | |
| D671,590 S | 11/2012 | Klinar et al. | |
| D680,152 S | 4/2013 | Olsson et al. | |
| D687,087 S | 7/2013 | Iurilli | |
| 8,542,326 B2 | 9/2013 | MacNaughton et al. | |
| D694,311 S | 11/2013 | Cho et al. | |
| 8,777,406 B2 | 7/2014 | Sugihara et al. | |
| D710,928 S | 8/2014 | Heinrich et al. | |
| D716,808 S | 11/2014 | Yeom et al. | |
| D718,305 S | 11/2014 | Olsson et al. | |
| D719,568 S | 12/2014 | Heinrich et al. | |
| D719,569 S | 12/2014 | Heinrich et al. | |
| D719,570 S | 12/2014 | Heinrich et al. | |
| D719,952 S | 12/2014 | Kim et al. | |
| D724,082 S | 3/2015 | Olsson et al. | |
| D724,083 S | 3/2015 | Olsson et al. | |
| D727,317 S | 4/2015 | Olsson et al. | |
| D738,373 S | 9/2015 | Davies et al. | |
| 2003/0090439 A1 | 5/2003 | Spitzer et al. | |
| 2005/0237271 A1 | 10/2005 | Yamamoto | |
| 2010/0110368 A1 | 5/2010 | Chaum | |
| 2010/0245754 A1* | 9/2010 | Matsumoto | G02B 27/0176 351/158 |
| 2010/0245757 A1 | 9/2010 | Sugihara et al. | |
| 2010/0253904 A1* | 10/2010 | Jannard | A61B 5/1112 351/158 |
| 2012/0013843 A1 | 1/2012 | Jannard | |
| 2012/0105740 A1 | 5/2012 | Jannard et al. | |
| 2013/0044042 A1 | 2/2013 | Olsson et al. | |
| 2013/0235331 A1* | 9/2013 | Heinrich | G02C 11/10 351/158 |
| 2014/0266986 A1 | 9/2014 | Magyari | |
| 2016/0223820 A1 | 8/2016 | Chow et al. | |

FOREIGN PATENT DOCUMENTS

| | | |
|---|---|---|
| EP | 0 551 781 A1 | 7/1993 |
| JP | D1470899 | 6/2013 |
| TW | D132974 | 1/2010 |
| TW | D138236 | 12/2010 |
| WO | WO 2008/076774 A2 | 6/2008 |
| WO | WO 2013/185224 A1 | 12/2013 |
| WO | WO 2014/093284 A1 | 6/2014 |
| WO | WO 2016/077696 A1 | 5/2016 |

OTHER PUBLICATIONS

International Preliminary Report on Patentability for PCT/US2013/074017, entitled "Spectacle With Invisible Optics," mailed Jun. 25, 2015.

* cited by examiner

User looking at virtual image

User looking straight on
(not looking at virtual image)

SPECTACLE WITH INVISIBLE OPTICS

RELATED APPLICATION(S)

This application is a Continuation-in-Part of U.S. application Ser. No. 14/101,864, filed Dec. 10, 2013 which claims the benefit of U.S. Provisional Application No. 61/736,867, filed Dec. 13, 2012, and U.S. Provisional Application No. 61/773,035, filed Mar. 5, 2013. The entire teachings of the above applications are incorporated herein by reference.

BACKGROUND

Traditional head mounted displays (HMD) or video eyewear are bulky, clumsy and look odd to wear.

SUMMARY

The present invention can provide a wearable electronic display including an eyewear frame having a first side frame portion. A display module with a micro-display for generating images can be mounted to the eyewear frame. The display module can have an elongate portion with an image exit window positioned for directing viewable images to a user's eye.

In particular embodiments, the eyewear frame can have a second side frame portion, and a front frame portion connected between the first and second side frame portions. The front frame portion can have at least one of above eye and below eye frame members. The elongate portion of the display module can laterally extend generally along the level of one of the above eye and below eye frame members. The image exit window can be tilted in one of upwardly and downwardly directions for viewing. In some embodiments, the eyewear frame can have the configuration of eyeglasses, with a front frame portion having above eye and below eye frame members being upper and lower portions of two eyewear rims, respectively. The elongate portion of the display module can have a generally comparable width and/or thickness as the eyewear rims, and can extend laterally generally along the level of one of the above eye and below eye frame members of the eyewear rims with the image exit window being positioned near or at the center of an eyewear rim. The display module can have an angular shaped portion that at least a portion of which can be positioned in a corner between the first side frame portion and the front frame portion.

In some embodiments, the eyewear frame can have a center bridge having at least one of an adjustable width for providing interpupillary distance (IPD) adjustment, and an adjustable height for adjusting the height of the front frame portion relative thereto. The center bridge can include at least one slider mechanism. The front frame portion can be pivotably secured to the first side frame portion and the second side frame portion by pivots about a horizontal axis for providing tilting of the front frame portion relative to the side frame portions for angular optical axis adjustment. In some embodiments, a second display can be mounted to the eyewear frame for providing binocular viewing.

The present invention can also provide a wearable electronic display including an eyewear frame having the configuration of eyeglasses. The eyewear frame can include a front frame portion having two eyewear rims with upper and lower portions. The front frame portion can be connected between first and second side frame members. A display module can be mounted to the eyewear frame and can have a micro-display for generating images. The display module can have an angular shaped portion that at least a portion thereof is positioned in a corner between the first side frame portion and the front frame portion and can have an elongate portion with an image exit window positioned for directing viewable images to a user's eye. The elongate portion of the display module can extend laterally generally along the level of the upper portion of one eyewear rim, and can have a generally comparable thickness as the eyewear rim. The image exit window can be positioned near or at a center of the eyewear rim, and can be tilted in a downwardly direction for viewing.

The present invention can also provide a method of viewing images including wearing a wearable electronic display. The wearable electronic display can have an eyewear frame with a first side frame portion that is worn by a user. A display module with a micro-display for generating images can be mounted to the eyewear frame. Viewable images can be directed to an eye of the user from an image exit window positioned at an elongate portion of the display module.

In particular embodiments, the eyewear frame can be provided with a second side frame portion, and a front frame portion connected between the first and second side frame portions. The front frame portion can have at least one of above eye and below eye frame members. The elongate portion of the display module can be laterally extended generally along the level of one of the above eye and below eye frame members. The image exit window can be tilted in one of upwardly or downwardly directions for viewing by the eye of the user. In some embodiments, the eyewear frame can be provided with the configuration of eyeglasses, with a front frame portion having above eye and below eye frame members being upper and lower portions of two eyewear rims, respectively. The elongate portion of the display module can be provided with a generally comparable width and/or thickness as the eyewear rims, and the elongate portion of the display module can extend laterally generally along the level of one of the above eye and below eye frame members of the eyewear rims with the image exit window being positioned near or at the center of an eyewear rim. The display module can be provided with an angular shaped portion, and at least a portion thereof can be positioned in a corner between the first side frame portion and the front frame portion.

In some embodiments, the eyewear frame can have a center bridge having at least one of an adjustable width for providing interpupillary distance (IPD) adjustment, and an adjustable height for adjusting the height of the front frame portion relative thereto. The center bridge can include at least one slider mechanism. The front frame portion can be pivotably secured to the first side frame portion and the second side frame portion by pivots about a horizontal axis for providing tilting of the front frame portion relative to the side frame portions for angular optical axis adjustment. In some embodiments, a second display can be mounted to the eyewear frame for providing binocular viewing.

The present invention can also provide a method of viewing images including wearing a wearable electronic display that has an eyewear frame with the configuration of eyeglasses. The eyewear frame can include a front frame portion having two eyewear rims with upper and lower portions. The front frame portion can be connected between first and second side frame members and worn by a user. A display module can be mounted to the eyewear frame and have a micro-display for generating images. The display module can have an angular shaped portion that at least a portion thereof is positioned in a corner between the first side frame portion and the front frame portion. Viewable images can be directed to an eye of the user from an image exit window positioned at an elongate portion of the display module. The elongate portion can extend laterally generally along the level of the upper portion of one eyewear rim and have a generally comparable thickness as the eyewear rim. The image exit window can be positioned near or at a center of the eyewear rim and tilted in a downwardly direction for viewing.

The present invention can also provide a wearable electronic display including an eyewear frame having a first side frame portion. A display module can be mounted to the eyewear frame and have a micro-display for generating images. A display module can have an elongate portion with an image exit window positioned for directing viewable images to a user's eye. An adjustment mechanism can adjust the position of the image exit window.

In particular embodiments, the eyewear frame can have a second side frame portion, and a front frame portion connected between the first and second side frame portions. The front frame portion can have at least one of above eye and below eye frame members. The eyewear frame can have a front frame portion connected to the first side frame portion. The front frame portion can have at least one above eye frame member. The elongate portion of the display module can laterally extend generally along the level of the at least one above eye frame member. The image exit window can be tilted in a downwardly direction for viewing. The eyewear frame can have the configuration of eyeglasses, with a front frame portion having above eye and below eye frame members being upper and lower portions of two eyewear rims, respectively. The elongate portion of the display module can have a generally comparable width and/or thickness as the eyewear rims, while extending laterally generally along the level of the above eye frame members of the eyewear rims with the image exit window being positioned near or at the center of an eyewear rim. The eyewear frame can have a front frame portion connected to the first side frame portion and a corner therebetween. The display module can have an angular shaped portion that at least a portion thereof is positioned in the corner.

The adjustment mechanism can adjustably mount the display module to the eyewear frame, providing rotational adjustment about a lateral, transverse or horizontal axis, and linear adjustment along the lateral axis. The adjustment mechanism can include an adjustment bracket movably mounting the display module to the eyewear frame. The adjustment bracket can be rotationally mounted to the eyewear frame about the lateral axis by a rotational mechanism having a lateral pivot on the lateral axis, and the display module can be slidably mounted with the adjustment bracket along the lateral axis by a sliding mechanism. The rotational mechanism can include an adjustment gear mounted to the adjustment bracket in a rotationally fixed manner about the lateral axis, and rotationally engaging a rotatable geared rotational adjustment actuator. In some embodiments, the rotationally fixed adjustment gear can be a worm gear, and the rotatable geared rotational adjustment actuator can be a worm that is rotatably mounted to the eyewear frame about an axis offset and perpendicular to the lateral axis. The adjustment bracket can include a sliding post structure extending from the display module. The worm gear can be slidably mounted to the adjustment bracket along the lateral axis while being rotationally fixed relative to the adjustment bracket. The worm gear can be rotatably mounted about the lateral axis to the eyewear frame. An adjustment screw linear adjustment actuator can extend through the eyewear frame along the lateral axis through the worm gear to rotatably engage mating threads on the adjustment bracket. This can form a sliding mechanism that is adjusted along the lateral axis by the adjustment screw linear adjustment actuator. In other embodiments, the sliding mechanism can include a series of protrusions extending from the display module and slidably engaging linear guide tracks within the adjustment bracket. A rotatable linear adjustment actuator can be rotatably mounted to the adjustment bracket and have a cam surface for moveably engaging at least one of the protrusions for slidably moving the display module back and forth relative to the adjustment bracket along the lateral axis. The linear adjustment actuator can include an elongate slot forming the cam surface. The elongate slot can be at least one of a linear and a spiral slot.

The present invention can also provide a wearable electronic display including an eyewear frame having the configuration of eyeglasses, including a front frame portion having two eyewear rims with upper and lower portions. The front frame portion can be connected between first and second side frame members and have interior corners therebetween. A display module can be mounted to the eyewear frame having a micro-display for generating images. The display module can have an angular shaped portion that at least a portion thereof is positioned in the corner between the first side frame portion and the front frame portion, and an elongate portion with an image exit window positioned for directing viewable images to a user's eye. The elongate portion of the display module can extend laterally generally along the level of the upper portion of one eyewear rim and have a generally comparable thickness as the eyewear rim. The image exit window can be positioned near or at a center of the eyewear rim and tilted in a downwardly direction for viewing. An adjustment mechanism can include an adjustment bracket movably mounting the display module to the eyewear frame for adjusting the position of the image exit window.

The present invention can also provide a method of viewing images including wearing a wearable electronic display that has an eyewear frame with a first side frame portion worn by a user. A display module can be mounted to the eyewear frame and have a micro-display for generating images. Viewable images can be directed to an eye of the user from an image exit window positioned at an elongate portion of the display module. The position of the image exit window can be adjusted with an adjustment mechanism.

In particular embodiments, the eyewear frame can be provided with a second side frame portion, and a front frame portion connected between the first and second side frame portions. The front frame portion can have at least one of above eye and below eye frame member. The eyewear frame can be provided with a front frame portion connected to the first side frame portion. The front frame portion can have at least one above eye frame member. The elongate portion of the display module can be laterally extended generally along the level of the at least one above eye frame member. The image exit window can be tilted in one of upwardly or downwardly directions for viewing by the eye of the user. The eyewear frame can be provided with the configuration of eyeglasses with a front frame portion having above eye and below eye frame members being upper and lower portions of two eyewear rims, respectively. The elongate portion of the display module can be provided with a generally comparable width and/or thickness as the eyewear rims, and the elongate portion of the display module can extend laterally generally along the level of the above eye frame members of the eyewear rims with the image exit window being positioned near or at the center of an eyewear rim. The eyewear frame can be provided with a front frame portion connected to the first side frame portion with a corner therebetween. The display module can have an angular shaped portion, and at least a portion thereof can be positioned in the corner.

The display module can be adjustably mounted to the eyewear frame with the adjustment mechanism, providing rotational adjustment about a lateral axis and linear adjustment along the lateral axis. The display module can be movably mounted to the eyewear frame with an adjustment bracket of the adjustment mechanism. The adjustment bracket can be rotationally mounted to the eyewear frame about the lateral axis with a rotational mechanism having a lateral pivot on the lateral axis. The display module can be slidably mounted with the adjustment bracket along the lateral axis with a sliding mechanism. The rotational mechanism can be provided with an adjustment gear mounted to the adjustment bracket in a rotationally fixed manner about the lateral axis that rotationally engages a rotatable geared rotational adjustment actuator. In some embodiments, the rotationally fixed adjustment gear can be provided as a worm gear, and the rotatable geared rotational adjustment actuator can be provided as a worm that is rotatably mounted to the eyewear frame about an axis offset and perpendicular to the lateral axis. The adjustment bracket can include a sliding post structure extending from the display module. The worm gear can be slidably mounted to the adjustment bracket along the lateral axis while being rotationally fixed to the adjustment bracket. The worm gear can be rotatably mounted about the lateral axis to the eyewear frame. An adjustment screw linear adjustment actuator can extend through the eyewear frame along the lateral axis through the worm gear to rotatably engage mating threads on the adjustment bracket. This can form a sliding mechanism that is adjusted along the lateral axis by the adjustment screw linear adjustment actuator. In other embodiments, the sliding mechanism can be provided with a series of protrusions extending from the display module that slidably engage linear guide tracks within the adjustment bracket. A rotatable linear adjustment actuator can be rotatably mounted to the adjustment bracket and have a cam surface for movably engaging at least one of the protrusions for slidably moving the display module back and forth relative to the adjustment bracket along the lateral axis. The linear adjustment actuator can be provided with an elongate slot forming the cam surface. The elongate slot can be formed as at least one of a linear and a spiral slot.

The present invention can also provide a method of viewing images including wearing a wearable electronic display having an eyewear frame with the configuration of eyeglasses, including a front frame portion having two eyewear rims with upper and lower portions. The front frame portion can be connected between first and second side frame members with interior corners therebetween, and worn by a user. The display module can be mounted to the eyewear frame and can have a micro-display for generating images. The display module can have an angular shaped portion that at least a portion thereof is positioned in the corner between the first side frame portion and the front frame portion. Viewable images can be directed to an eye of the user from an image exit window positioned at an elongate portion of the display module. The elongate portion can extend laterally generally along the level of the upper portion of one eyewear rim and can have a generally comparable thickness as the eyewear rim. The image exit window can be positioned near or at the center of the eyewear rim and tilted downwardly direction for viewing. The position of the image exit window can be adjusted with an adjustment bracket of an adjustment mechanism. The adjustment bracket can movably mount the display module to the eyewear frame.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7A shows the user looking straight ahead, and FIG. 7B shows the user looking at a virtual image from the display module.

DETAILED DESCRIPTION OF THE INVENTION

Figure 1:
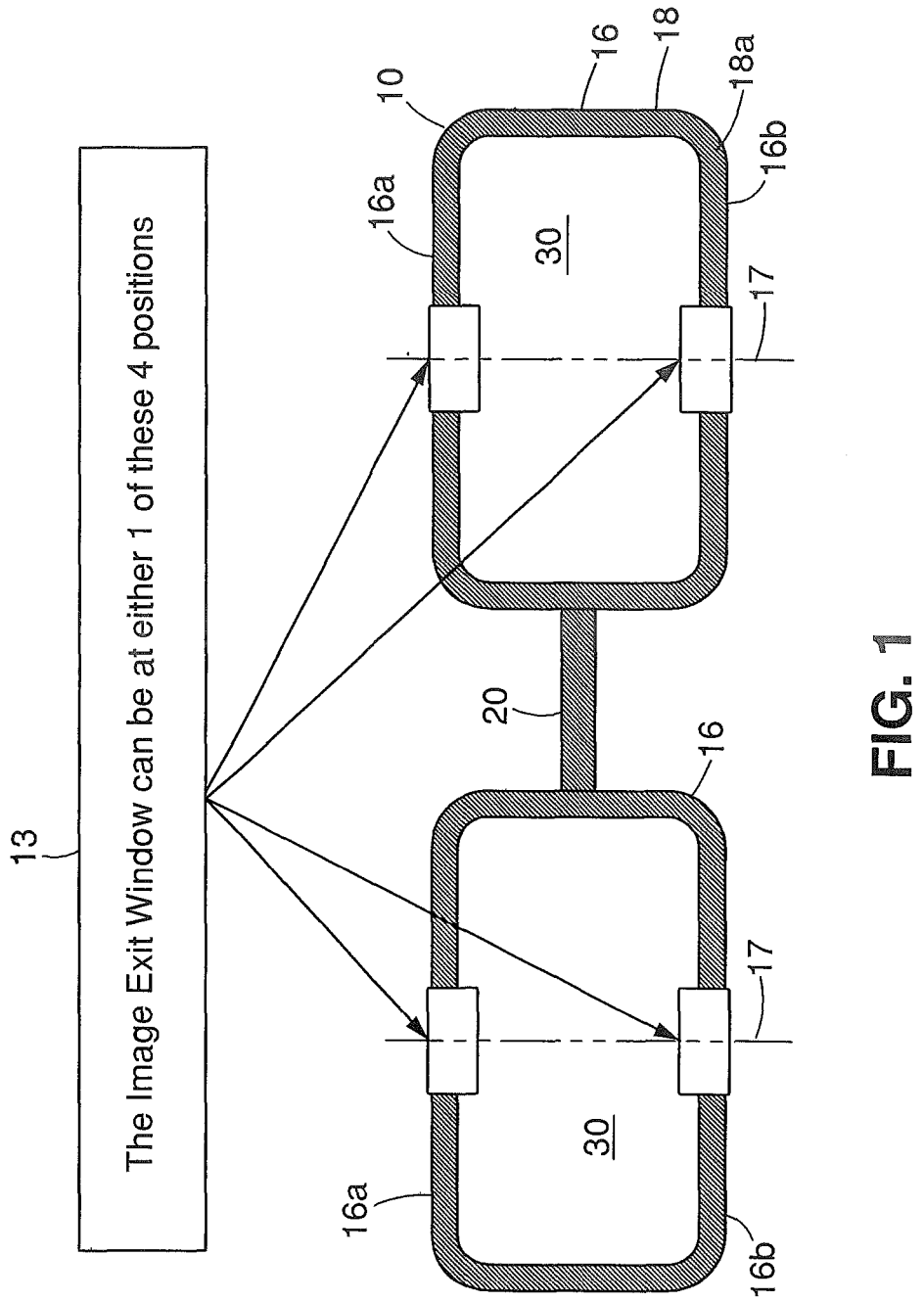
FIG. 1 is a schematic front view of an embodiment of a wearable electronic display in the present invention.
Figure 2:
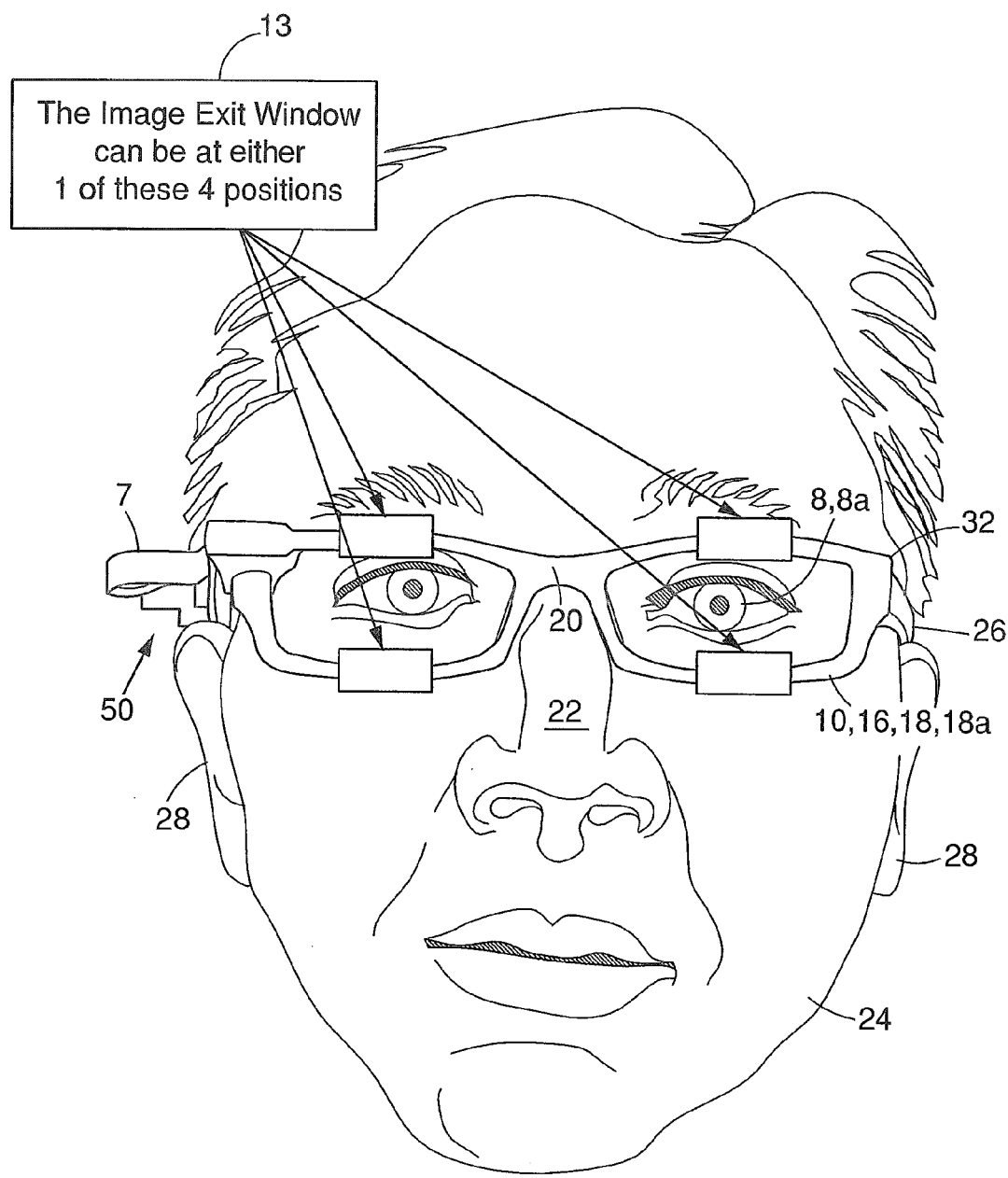
FIG. 2 is a front view of a user wearing an embodiment of the present invention electronic display.

A description of example embodiments of the invention follows.

Referring to FIGS. 1-3B, in embodiments of the present invention, a wearable spectacle, eyeglasses, or eyewear electronic display 10 can have a spectacle, eyeglass or eyewear frame 18 that can have the appearance of conventional spectacles, eyeglasses or eyewear, while also including an active optical virtual image display component, device or module 12 for viewing images. The frame 18 of the eyewear display 10 can have at least one eyeglass or eyewear rim 16, usually two connected together by a center bridge or connecting portion or member 20 for resting on the nose 22 of a user 24. Two (or first and second) side frame portions, legs, temples or stems 26 can each be connected to respective rims 16 on opposite sides of the frame 18 by hinges 32 for resting on the user's 24 ears 28. The rims 16 can contain eyeglass or eyewear lenses 30, which can be prescription or nonprescription lenses, sunglass lenses, light responsive lenses, safety lenses, etc., as desired.

Thin, small, compact or miniature optics 14 can be used to bring the image generated or from an active matrix electronic display or micro-display 6 (such as a display less than 1 inch diagonal) of the display module 12 to the eye or eyeball 8 of a user 24 through an optical image exit window 13 to form virtual images on the retina 8a. A wearable thin frame spectacle, eyeglasses or eyewear electronic display 10 can be provided which looks natural and yet can contain a display module 12 embedded therein or positioned relative to, or in a manner so that the display module 12 appears invisible or is not readily apparent or seen. The thin optics 14 can have a thickness and/or depth that is compatible with, or have similar or comparable dimensions as the rim 16 of a spectacle, eyeglass or eyewear frame 18 (such as less than 7 mm), and can form part of or appear to form, or can be incorporated into the frame of the spectacle or eyewear frame 18.

Figure 3A:
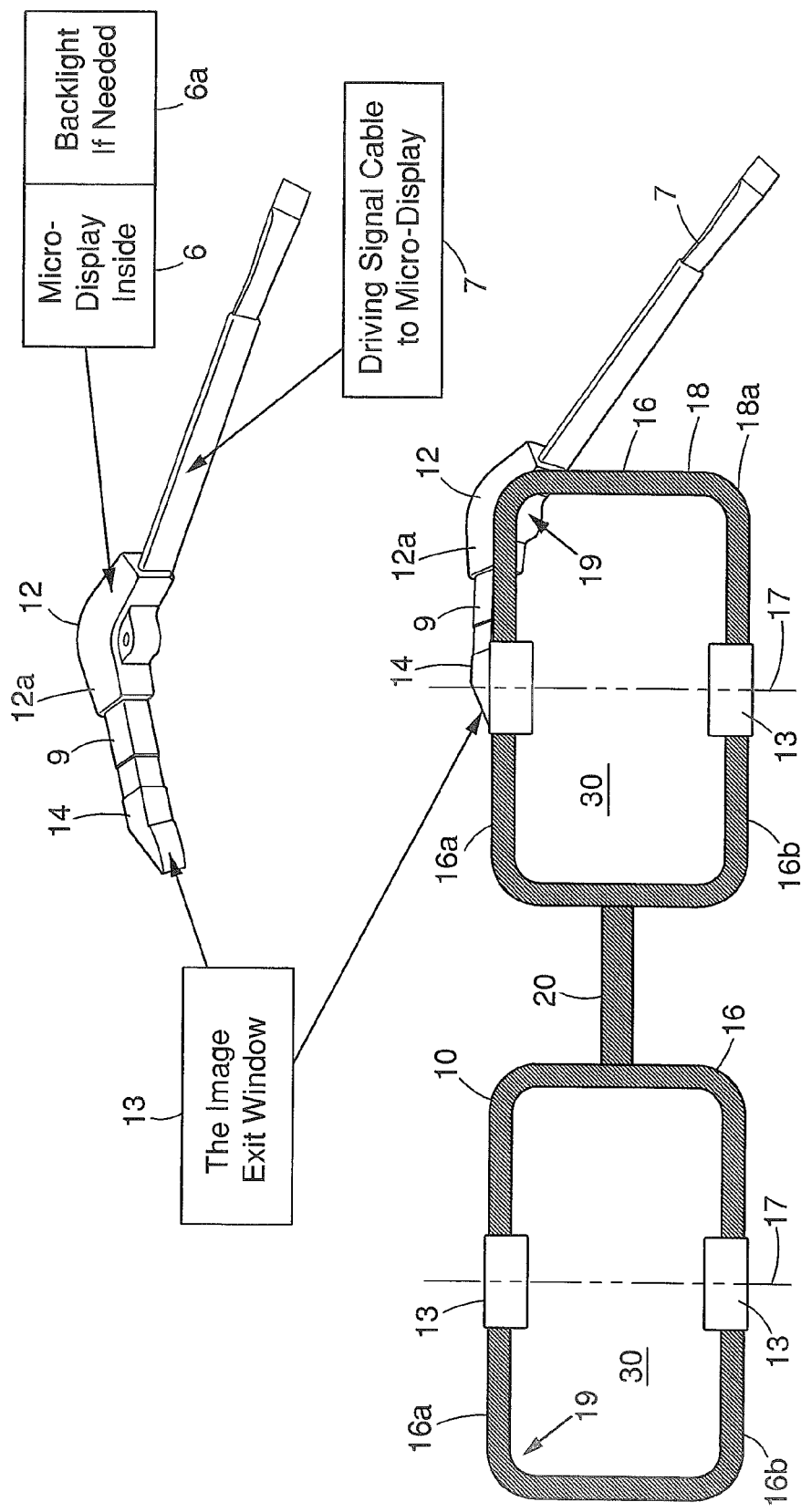
FIG. 3A is a schematic drawing of an embodiment of the present invention electronic display and virtual display module.
Figure 3B:
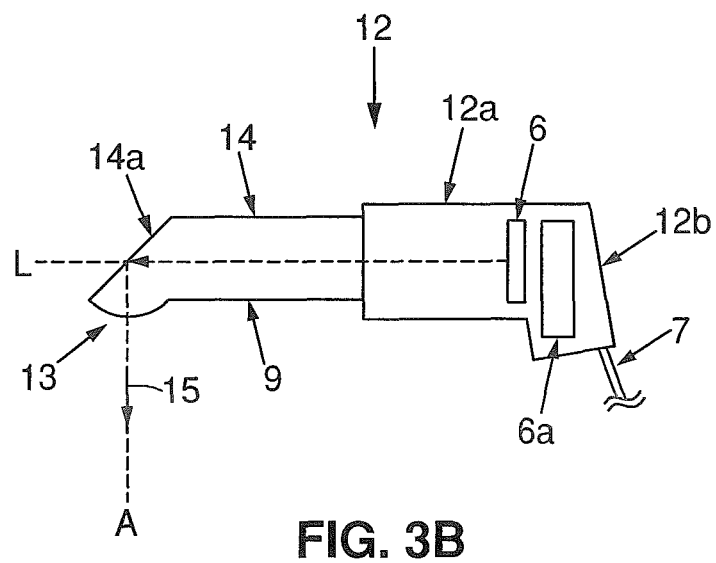
FIG. 3B is a schematic drawing of an embodiment of a virtual display module.

The display module 12 can have a housing 12a shaped as a generally angled, angular, bent, folded or corner piece, member or structure to contain the micro-display 6 and backlight source 6a (if needed), and can be or appear to be incorporated into or form part of the frame 18 of the spectacle, such as at a corner 19 of the frame 18, or at a position which is normally for the hinge 32 of the leg or side frame portion 26 connecting to the front frame portion 18a. The display module 12 can be connected to the front frame portion 18a. The image exit window 13 of the active matrix display 6 can be located near the center 17 of the upper (above eye) or lower (below eye) rims or frame members 16a and 16b of the frame 18. The width of the exit window 13 is not limited to any size as far as it does not exceed or substantially exceed the width of the rim 16 of the frame 18. The image exit window 13 can be at any of the four positions shown in FIGS. 1-3A, preferably at one of the upper frame positions. Referring to FIGS. 3A & 3B, the active-matrix micro-display 6 can be positioned within the generally angled, angular, bent folded or corner structure of the housing 12a, and a cable 7, such as a flex cable (or cables), can be connected to the micro-display 6 and backlight 6a, for providing signals to the micro-display 6. The image exit window 13 can be extended from the micro-display 6 by an extended or elongate portion 9 of the optics 14. The angled shape of the display module 12 not only can blend the display module 12 into the frame 18, but at the same time can package and position the optics 14 and the electrical connections/electronics to the micro-display in a manner that allows the image exit window 13 to be properly located or positioned at or near center 17, for desired viewing.

Figure 6A:
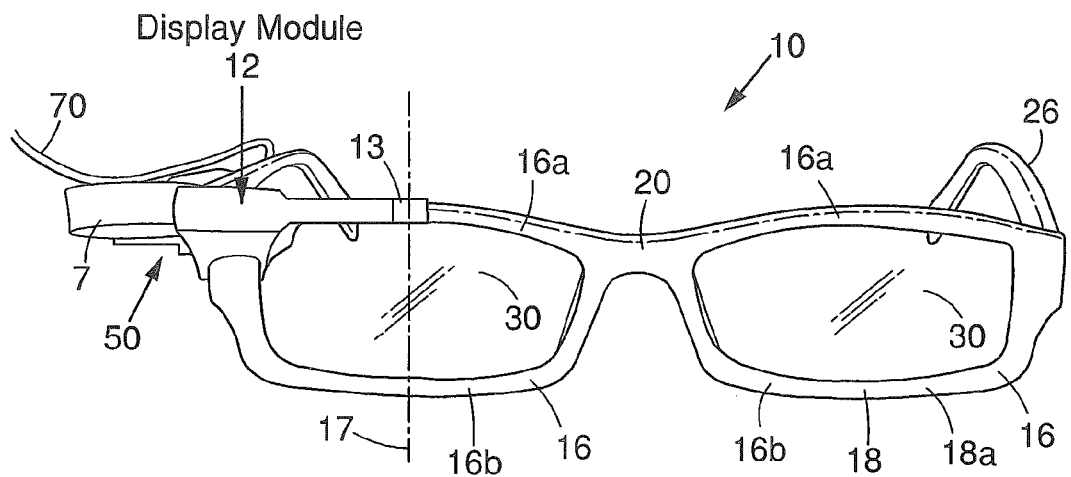
FIGS. 6A-6C depict an embodiment of the present invention electronic display from different front, top and perspective views respectively.
Figure 6B:
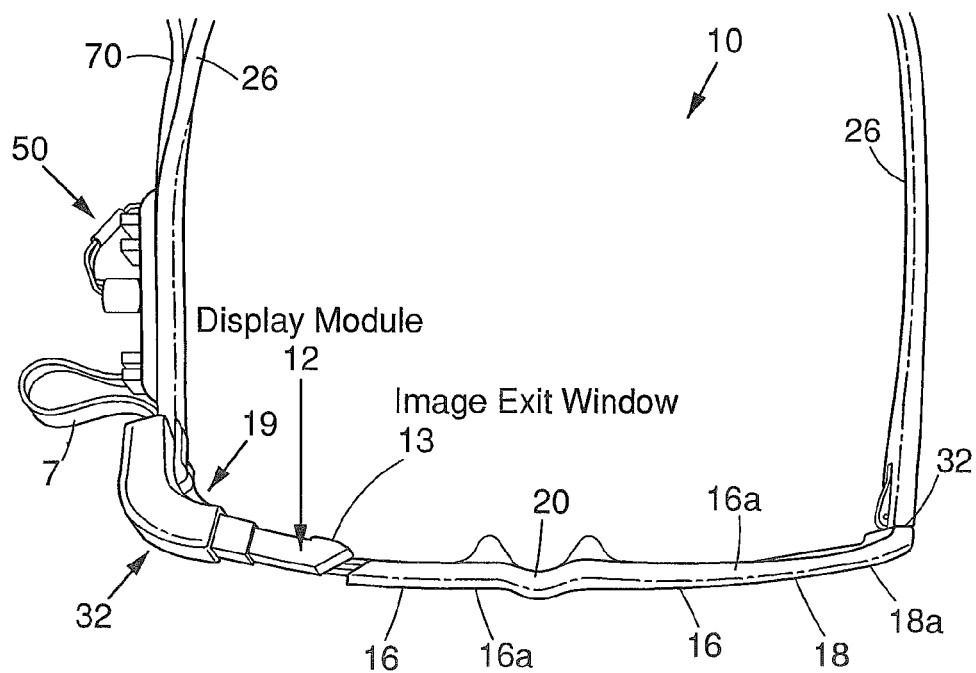
Figure 6C:
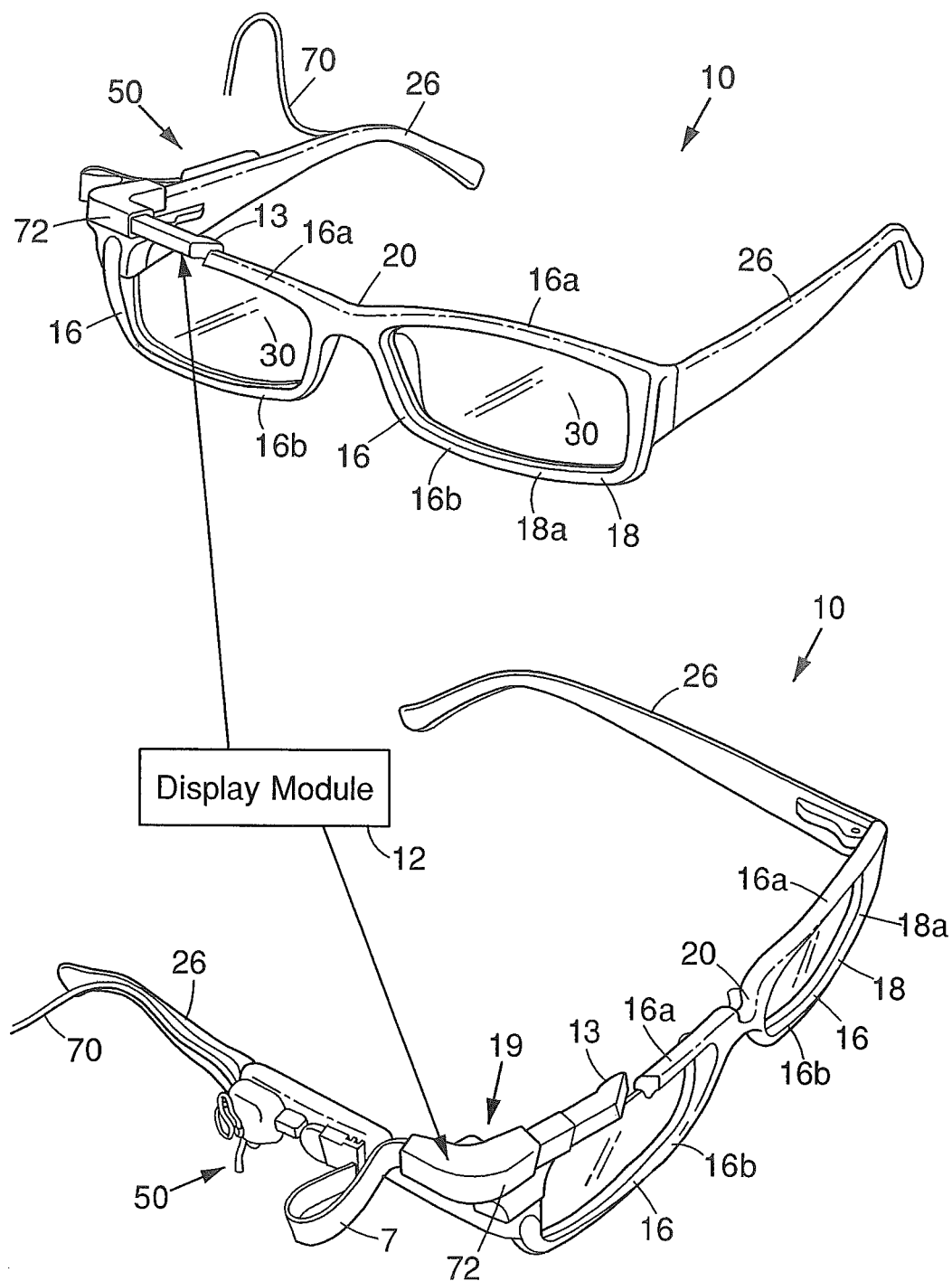

The elongate portion 9 can have a generally rectangular cross section and in some embodiments, can visually form part of the upper rim 16a, and can be positioned, located or joined behind the upper rim 16a (FIG. 3A), or can form one part of the upper rim 16a, and have a gap with the other portion of the upper rim 16a, as seen in FIG. 6C, or can be adjacent or joined thereto. If the elongate portion 9 is behind the rim 16, it can be larger as in FIG. 3A, or can be smaller or thinner than the rim 16. The thin optics can have suitable optical components, which can include lenses, mirrors, prisms, etc., for receiving an image 15 generated by the micro-display 6 and directing the image 15 longitudinally through elongate portion 9 along longitudinal axis L, which can be laterally relative to the user's 24 eye 8, and then redirected transverse to longitudinal axis L towards the user's 24 eye 8 by an optical component 14a, which can be a mirror or prism, along optical axis A, which can be a folded, redirected or bent optical axis, and include longitudinal axis L. The micro-display 6 and backlight 6a (if used) can also be positioned along axis L. In other embodiments, the backlight 6a can be positioned around the angled or bent portion 12b.

Figure 4:
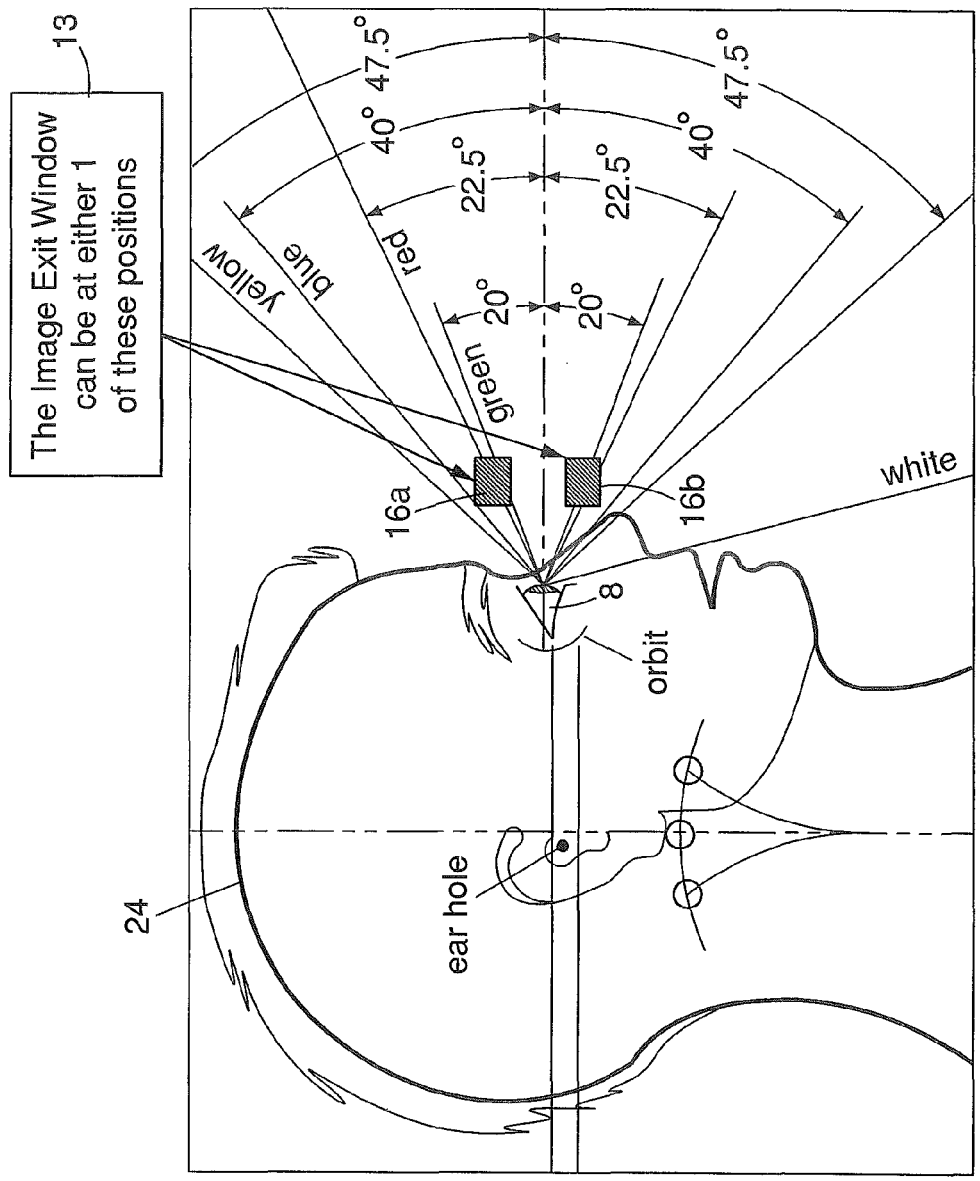
FIG. 4 is a schematic drawing showing possible upper and lower positions of the image exit window.
Figure 5:
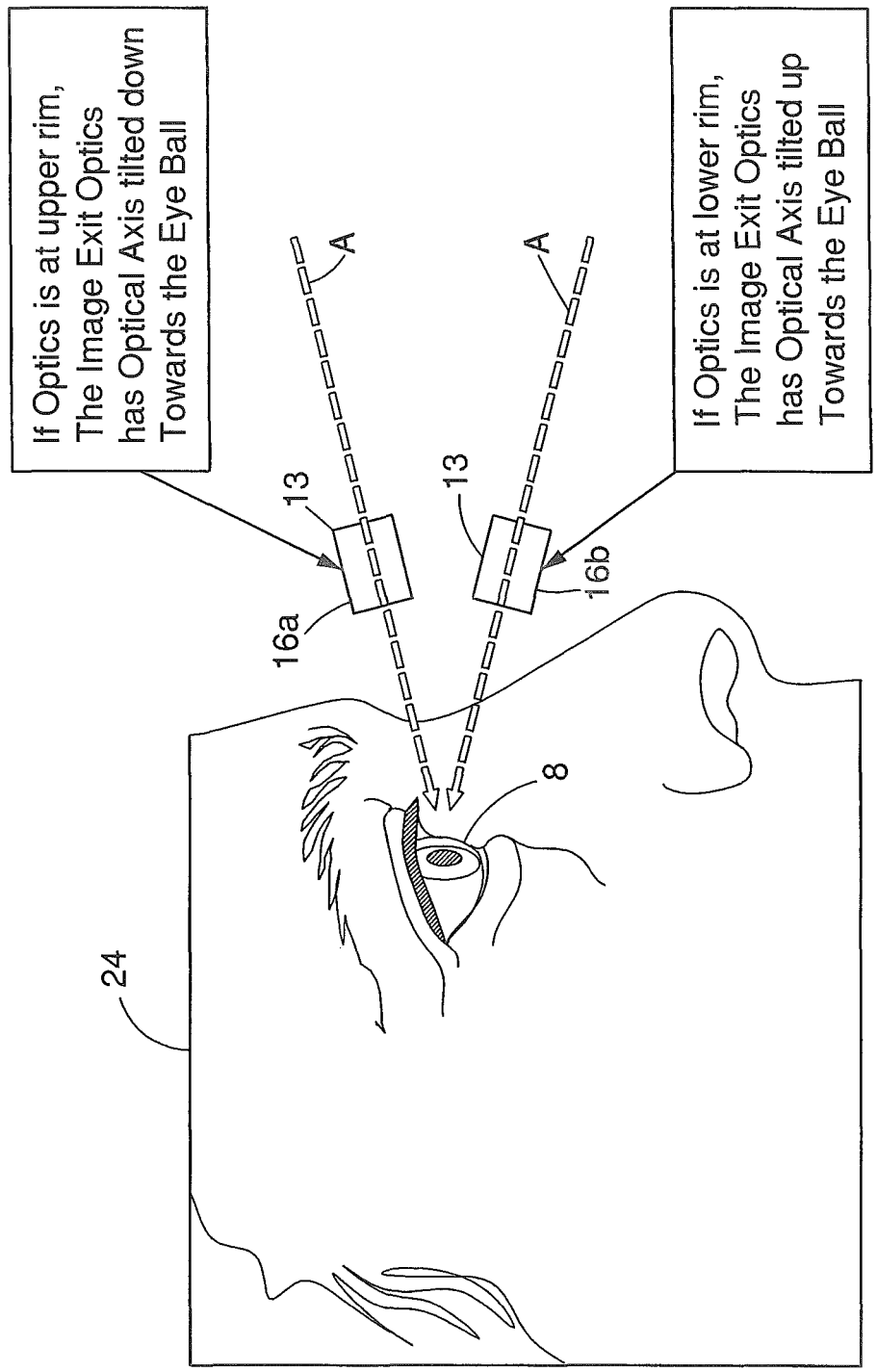
FIG. 5 is a schematic drawing of possible upper and lower optical axes of the image exit optics.

Referring to FIGS. 4 and 5, depending on the position of the image exit window 13, either upwardly or downwardly relative to the user's eyes 8, the optical axis A of the image exit optics of the display module 12 can tilt up or down towards the eyeballs 8 from the upper 16a or lower 16b rim of the spectacle or front frame portion 18a. This can facilitate comfortable viewing of the virtual image 15 which can be available in the virtual display module 12 through the exit window 13 of the optics. In addition, the optical axis A can tilt slightly laterally or slide to the left or to the right, if the image exit optics 14 is located at the right side or left side of the eye 8.

Referring to FIGS. 6A-6C, it can be seen that the display module 12 connected to the eyewear frame 18 can be incorporated or embedded into the appearance of the eyewear frame 18 without appearing bulky or apparent. The cable 7 extending from the housing 12a of the display module 12 can be electrically connected to an eyewear control system, operation system or electronics 50, for operating or controlling the display module 12. The electronics 50 can be positioned on the side frame portion 26 adjacent to the corner 19, at which the display module 12 is positioned. Appropriate electrical signals and power can be provided to the electronics 50 through a cable 70 electrically connected thereto.

Figure 7B:
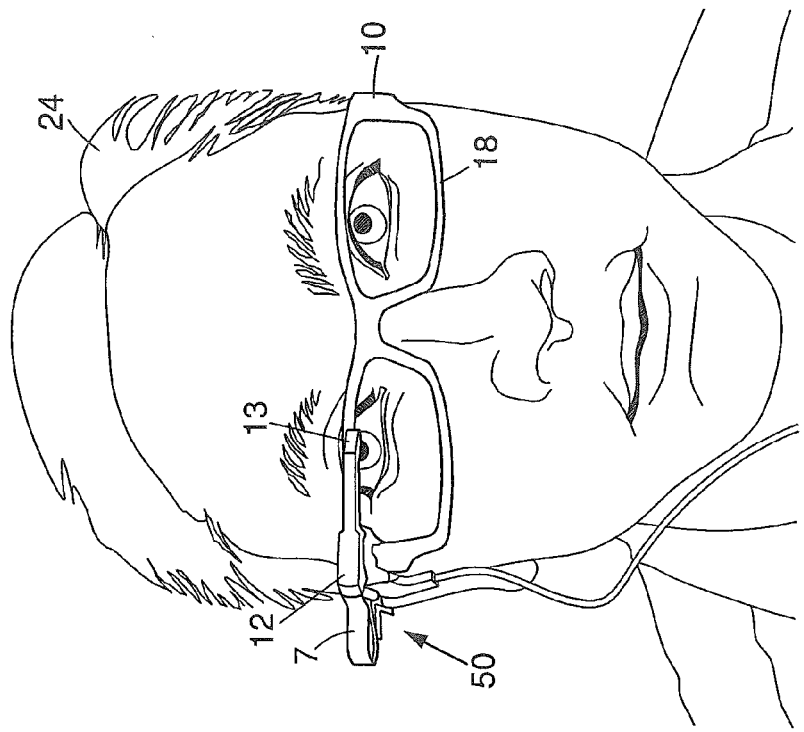
FIGS. 7A-7B are front views of a user wearing an embodiment of the present invention electronic display.
Figure 7A:
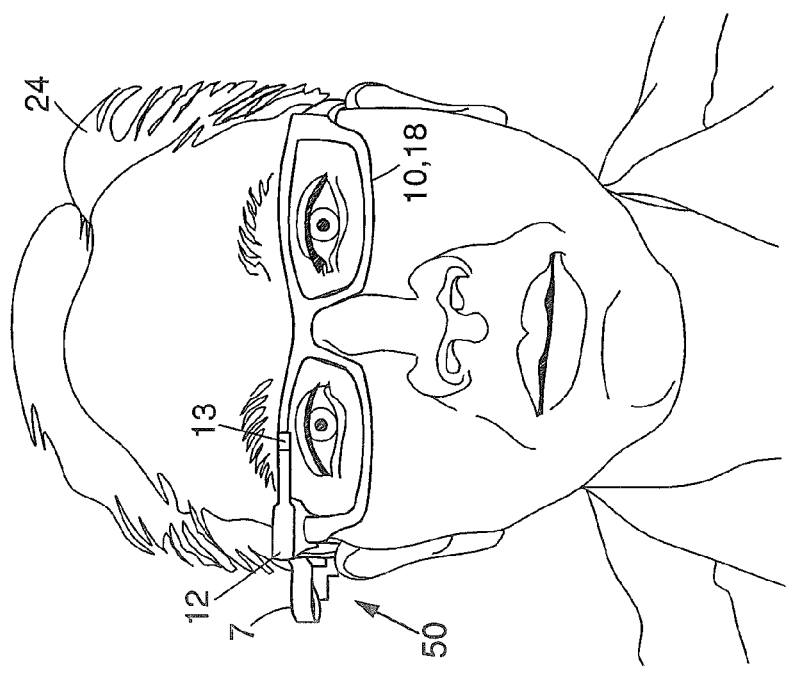

Referring to FIGS. 7A and 7B, the image exit window 13 can be positioned so that the user 24 can look straight forward through the eyewear frame 18 or spectacles without looking at a virtual image 15. When the user 24 desires to look at the virtual image 15, the user 24 can move his eyes 8 slightly to look into the image exit window 13 along center 17, for example, upwardly or downwardly and/or to one side. This can allow the user 24 wearing the eyewear display 10 to conduct normal activities, with generally normal vision, while also permitting the user 24 to view images 15 from the display module 12 when desired.

The optical display module 12 which contains the microdisplay 6 can be described as being invisible for its shape can be blended into or relative to the spectacle frame structure or eyewear frame 18. The housing 12a that holds the display 6, backlight 6a assembly, and for coupling the display 6 to the optics 14, can be shaped as an angle, bend, fold or corner that can blend into the corner 19 or side bend of the frame 18. The arm of the optics or elongate portion 9 that extends or positions the exit window 13 relative to the eyeball 8 can have a thickness close the thickness of the eyewear frame 18. FIGS. 7A and 7B show an elongate portion 9 that is slightly thicker than the upper rim portion 16a of the rim 16 of the frame 18. In some embodiments, the rim 16 can be thicker and the elongate portion 9 can be thinner than the rim 16.

Figure 8:
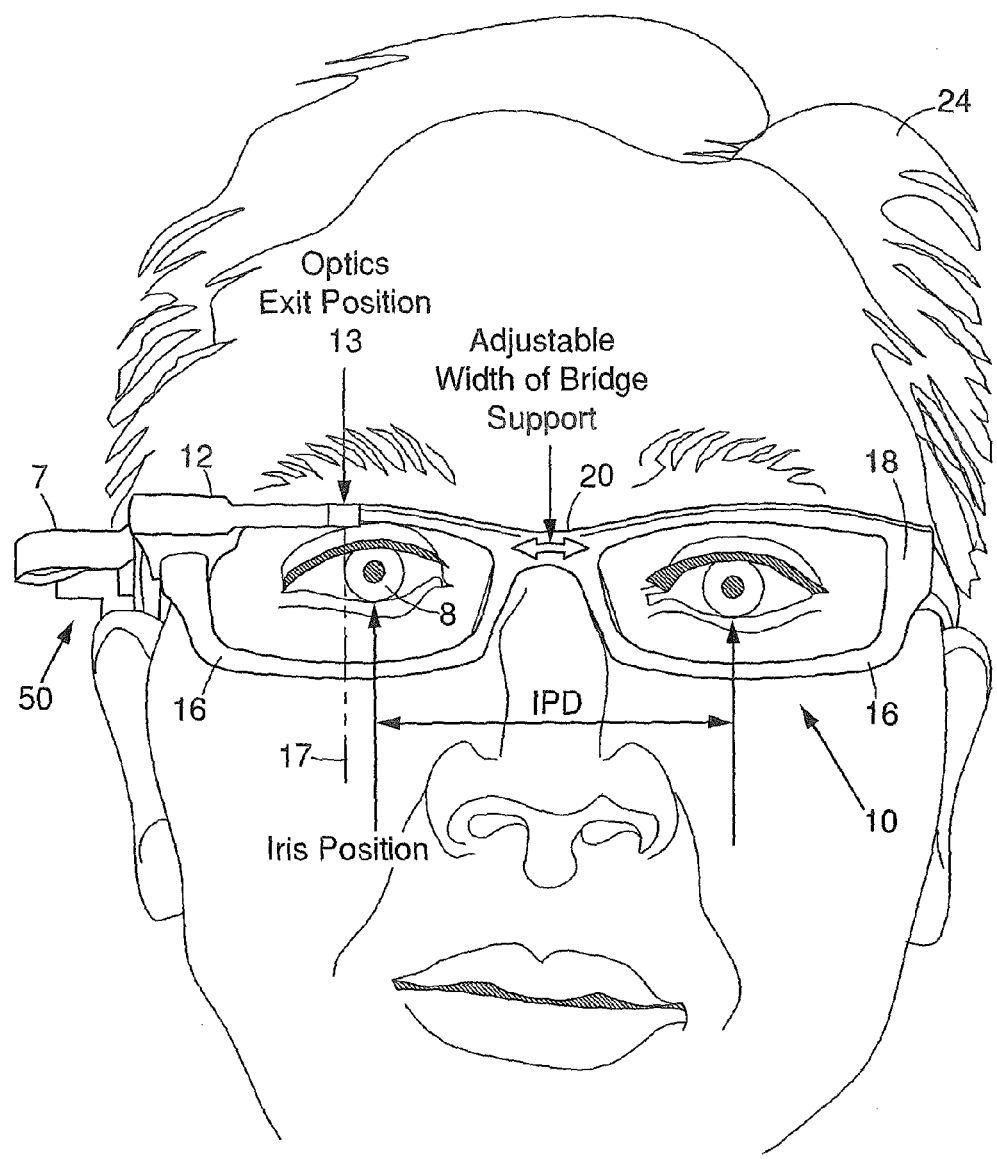
FIG. 8 is a schematic drawing of a user wearing another embodiment of the present invention electronic display.
Figure 9:
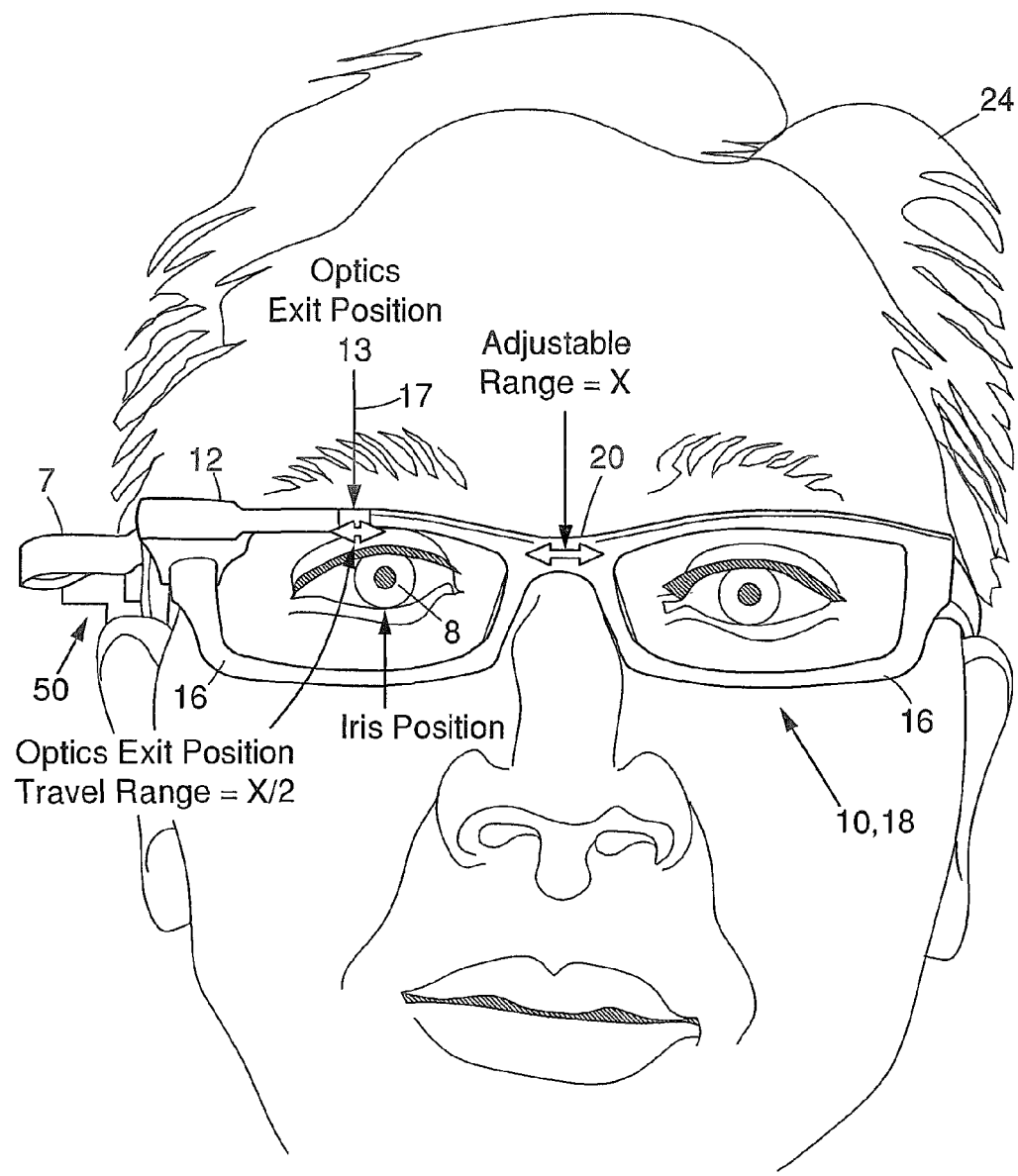
FIG. 9 is a schematic drawing depicting the adjustable range of the embodiment of FIG. 8.
Figure 10:
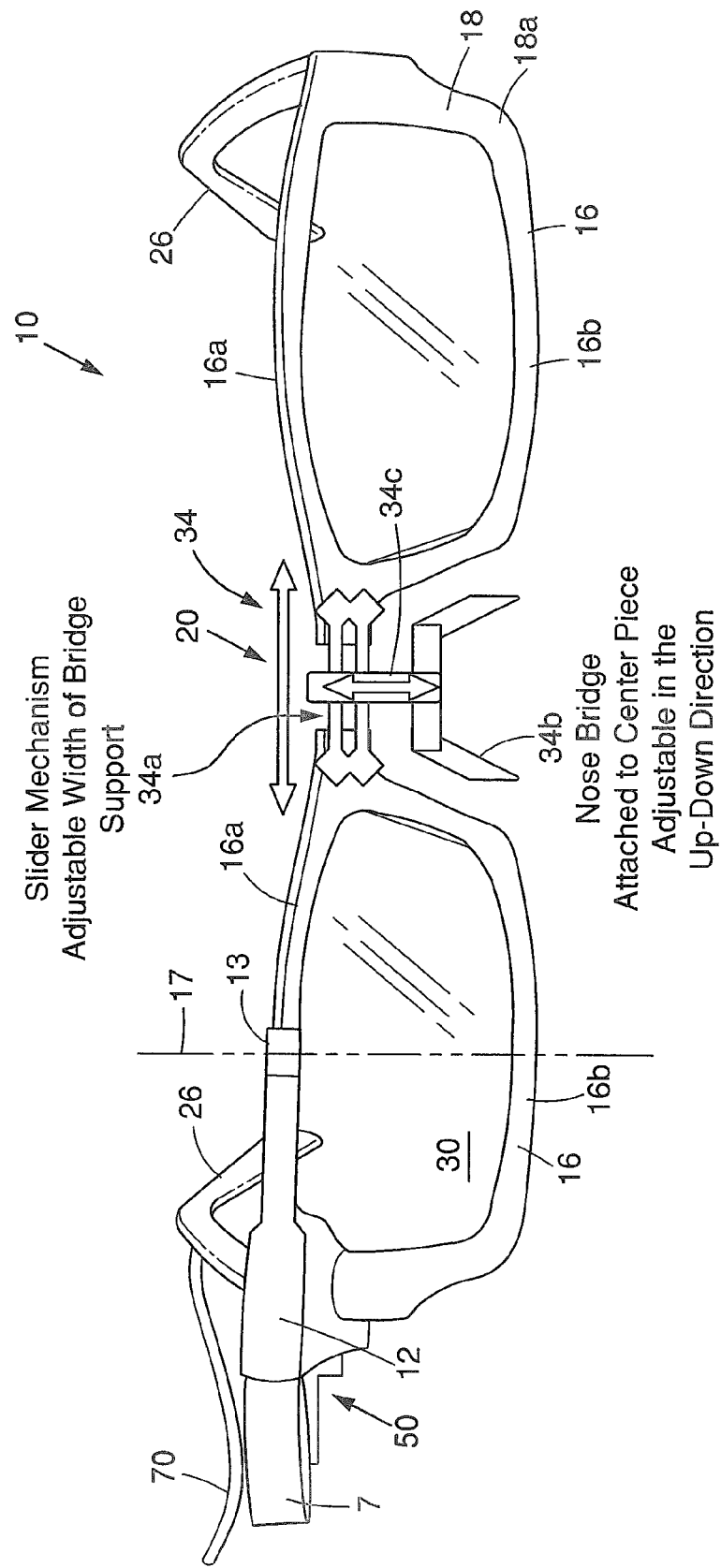
FIG. 10 is a schematic drawing of the embodiment of FIG. 8 showing nosebridge adjustment.

Referring to FIGS. 8-10, some embodiments in the present invention can have at least one adjustment mechanism 34 to facilitate adjustment of the position of the optical exit window 13 for particular users 24. The position of the optical exit window 13 can be adjusted left and right for aligning to the eyeball 8 for people with different interpupillary distances (IPD). FIG. 9 depicts the amount of adjustment for the width of a bridge 20 such that if the bridge 20 is adjusted a distance X, the travel range for the image exit window 13 relative to the user's eye is X/2. This can be implemented with adjustable mechanisms 34 such as at the center bridge 20 connected between rims 16 having an adjustable width using a sliding mechanism 34a, which can also change the distance between the two rims 16 of the frame 18. In addition, the front frame portion 18a can be moved up and down so that the optical axis A can be aligned to the eyeball 8. This can be implemented by having the center bridge 20 with a nose bridge member 34b that can be adjustable in the up and down direction such as with a sliding mechanism 34c for adjusting the height of the front frame portion 18a and rims 16 relative to the nose bridge 34b, or for adjusting to different sized noses 22. The nose bridge 34b at the center of the front frame portion 18a can be of an adjustable shape to fit different shapes and sizes of noses 22 for different people. The nose bridge 34b can be made of or have a material that is impervious to sweat so it doesn't slip forward. Rest members can be included at the corners of the frame nearest to the nose 22.

Figure 11:
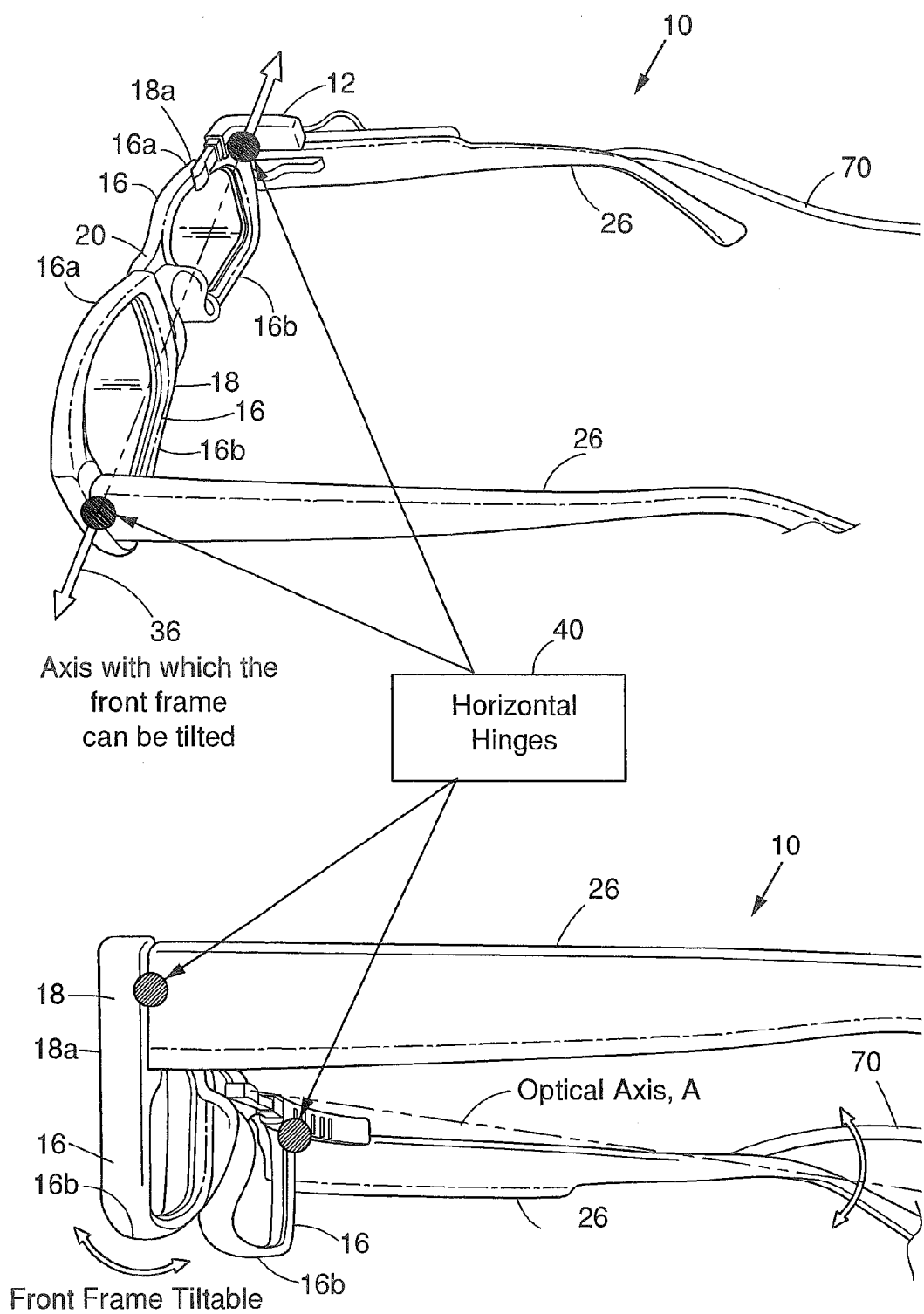
FIG. 11 are schematic drawings of an embodiment of the present invention electronic display having a tiltable front frame portion.
Figure 12:
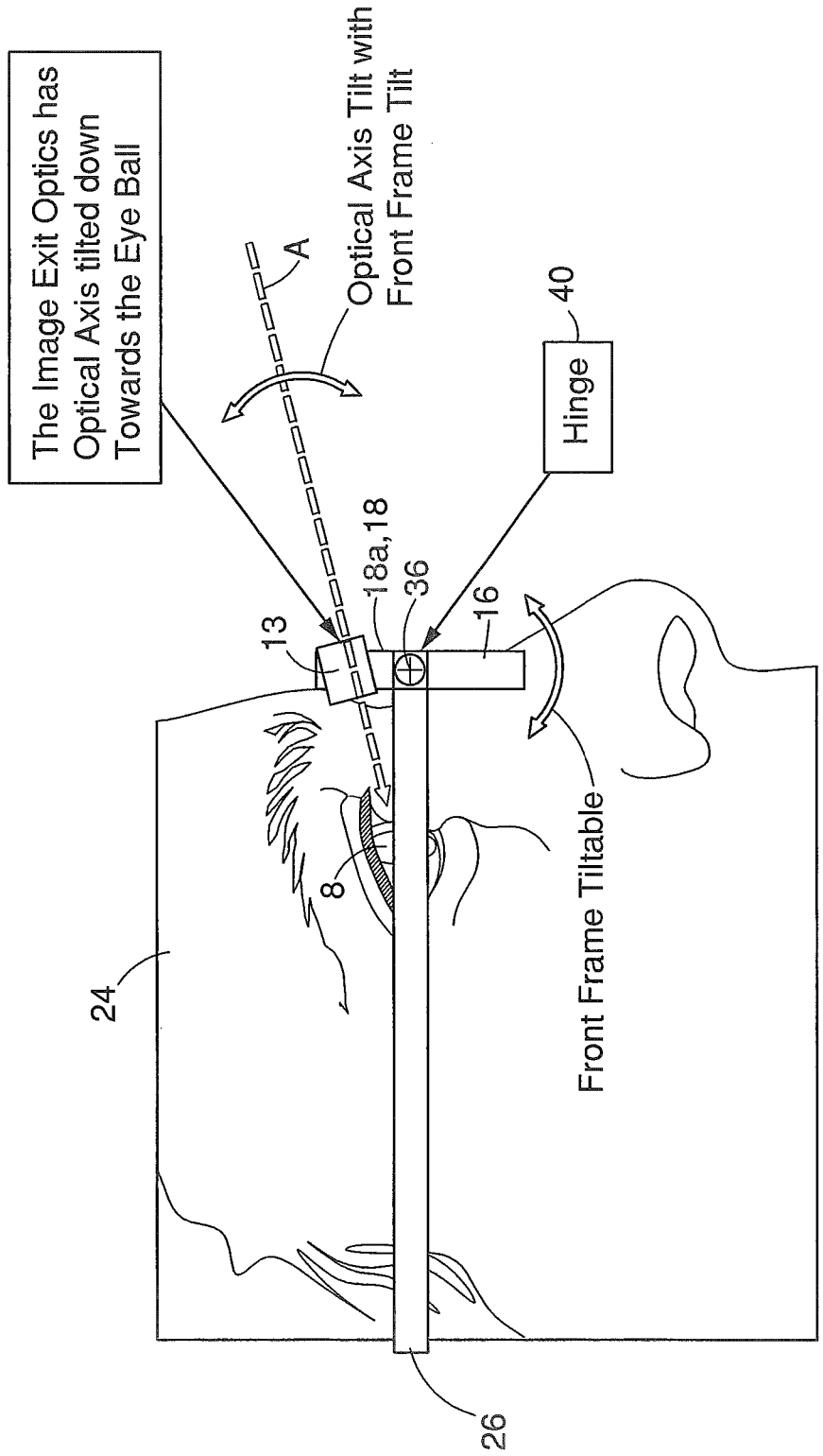
FIG. 12 is a schematic side view depicting tilting of the front frame portion.

Referring to FIGS. 11 and 12, the front frame portion 18a of frame 18 can have an adjustable tilt angle relative to the side frame portions 26. The optics 14 of the display module 12 can be fixed to or relative to the front frame portion 18a, and tilting the front frame portion 18a relative to the side frame portions 26 can have the effect of tilting the optical axis A of the display optics 14 towards the user's eyeball 8, such as upwardly or downwardly. The axis 36 about which the front frame portion 18 is tilted can be a lateral or horizontal axis connecting the front frame portion 18a to the two side frame portions 26 on opposite sides of the front frame portion 18a. The pivots or joints can be horizontal hinges or ball joints 40 connecting the front frame portion 18a to the side frame portions 26. In addition, sliding joints or features can be included for adjusting the height of the front frame portion 18a relative to the side frame portions 26 to adjust to different brow positions.

Figure 13:
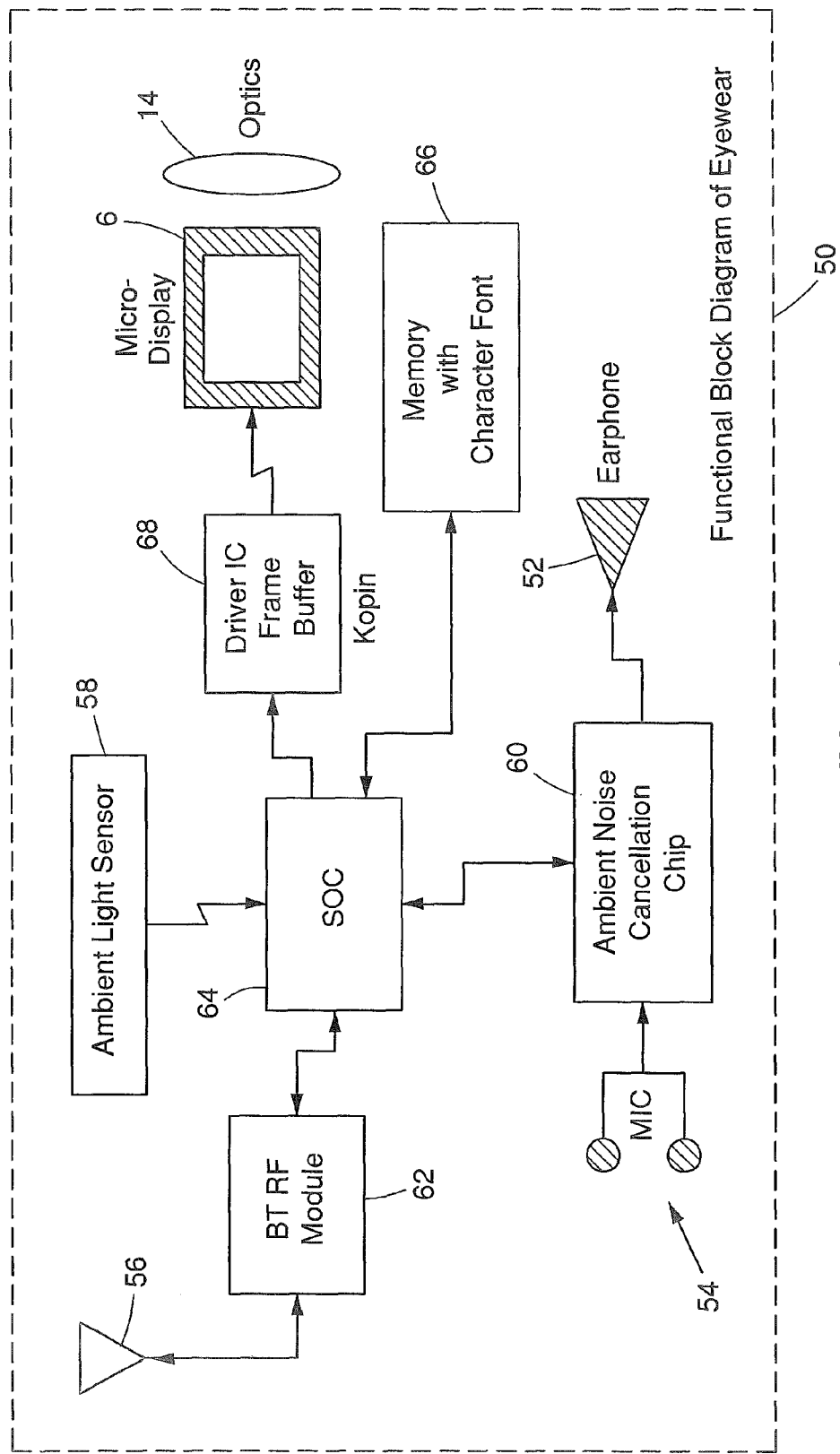
FIG. 13 is a schematic block diagram of an embodiment of an operation system.

FIG. 13 is a functional control block diagram of one embodiment of an eyewear control system, operation system or electronics 50 in the present invention, such as shown and described in U.S. Provisional Application No. 61/749,765, filed Jan. 7, 2013, the entire teachings of which are incorporated herein by reference. An electronics board and battery can be in the temple or stem 26 of the eyewear frame 18 and can be in front of the ear or behind the ear 28. The electronics can be in one temple and the battery can be in the other temple, with a flex cable imbedded inside the upper frame 16a and bridge 20 connecting the battery to the electronics. Audio output can be stereo with audio output on both sides of the temples or side frame portions 26. Audio output to the user can be implemented by bone conduction transducers, speakers, near-ear earphones, earbuds, 52 etc. The bone conduction material and element can be made adjustable to support different ear configurations or as a structural element that supports frame position to prevent slippage forward. The speaker volume can be automatically adjusted up or down depending on the ambient noise level. Multiple microphones 54 (two or three) can be embedded in either the frame 18 or the temple or side frame portion 26 for ambient noise canceling voice pickup via ambient noise cancellation electronics or chip 60. Electronics 50 can include radio link 56 to cell phone or other portable electronics, for audio, video, or image communication and can include a radio frequency module 62 which can be a Bluetooth module. An electronic compass can be provided to enable personal navigation applications. Display of other features including temperature, altitude, time, etc. can be included. This can be in sensors, or in an application that extracts data from the phone, or as part of software. Standalone sensor outputs can be used. An ambient light sensor 58 can be included so that the display brightness can be automatically adjusted. The electronics 50 can include a system on chip (SOC) 64, and can include memory with character font 66 and a driver IC frame buffer 68.

In some embodiments, the display module 12 can be inside the eyewear frame 18 closer to the eye 8 or can be outside the frame 18 further away from the eye, allowing prescription lenses 30 to be mounted within the frame 18 so that the user can view the images 15 in the optics 14 through the prescription lenses 30. The frame 18 can be mounted with prescription lenses 30 for people with myopia or a combination of transitional prescription lenses 30 for use in outdoor and indoor environments. Embodiments of the eyewear frame 18 can be designed so that the electronics, optics, and adjustment features are fixed, but a lens maker/optical house can develop a lens and frame structure that can snap into such an embodiment of the eyewear frame 18 as an option for providing a fixed complete frame with prescription lenses. There can be a standard frame with an optical prescription insert provided by a lens supplier. A camera 72 (FIG. 6C) can be included on the same side of the frame 18 as the display module 12, or can be included in housing 12a. This head-mounted display can also be binocular with two display modules 12 installed in symmetrical fashion, such as at two upper or lower locations indicated in FIGS. 1-3A. Electronics can receive video signals from a remote camera through the radio link, so that the display 12 on the frame 18 can be used as an electronic viewfinder of the remote camera unit.

Figure 14:
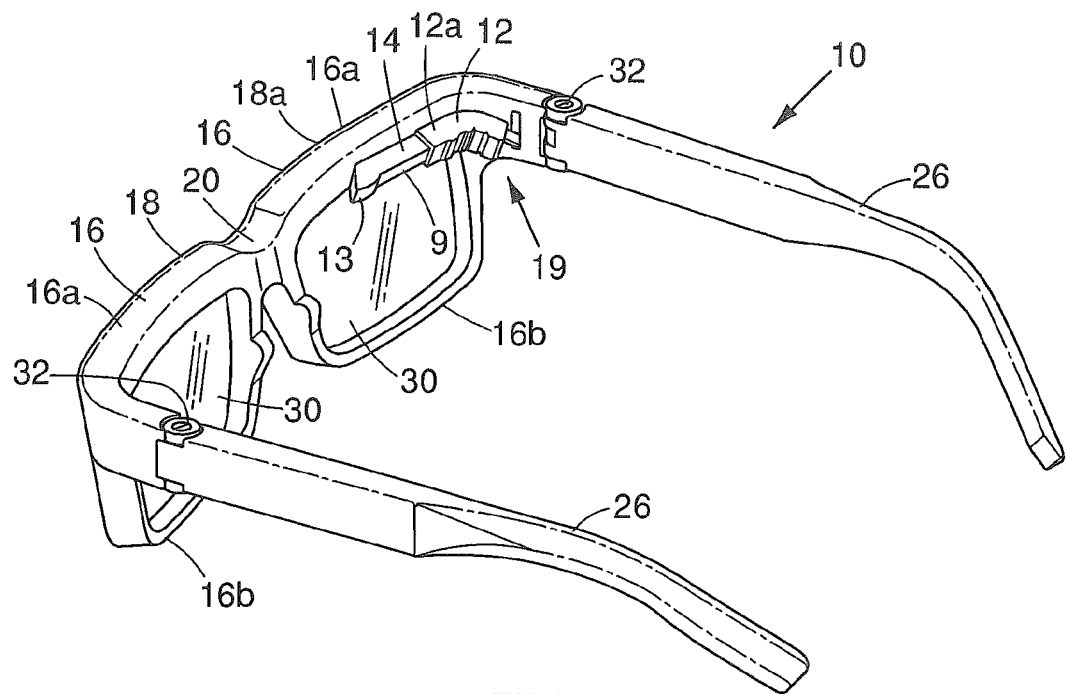
FIG. 14 is a perspective view of another embodiment of the present invention electronic display.
Figure 15:
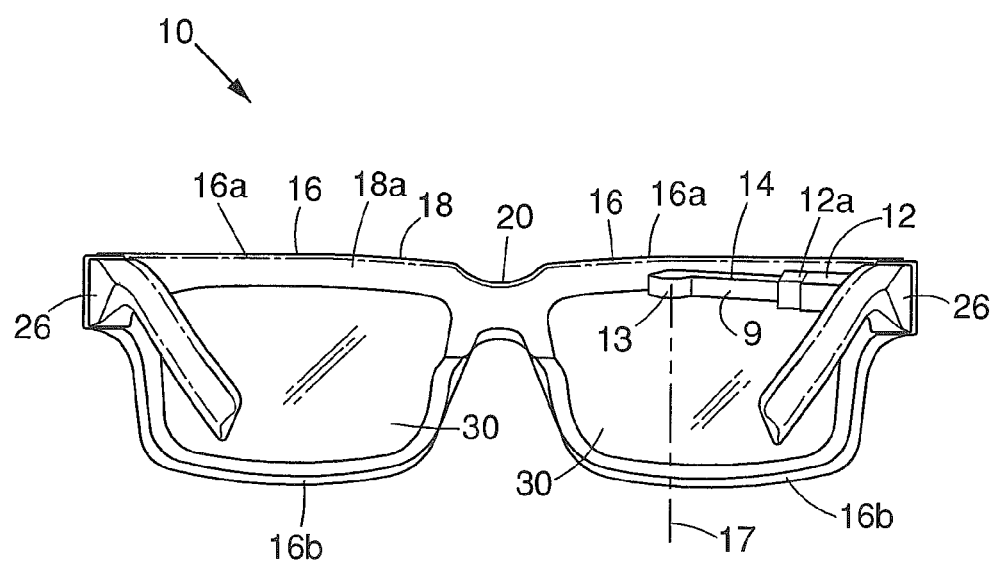
FIG. 15 is a rear view of the electronic display of FIG. 14.
Figure 16:
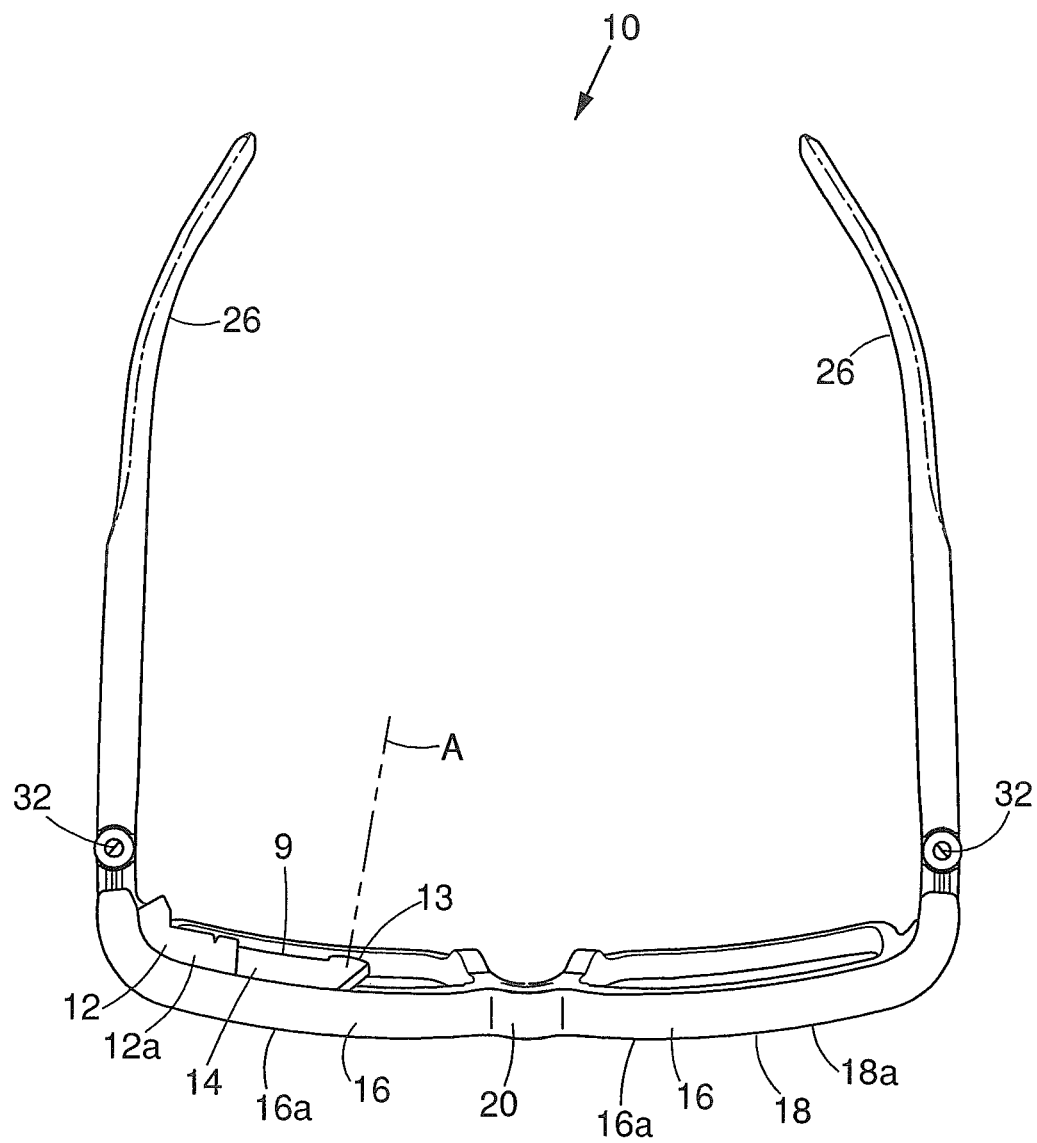
FIG. 16 is a top view of the electronic display of FIG. 14.
Figure 17:
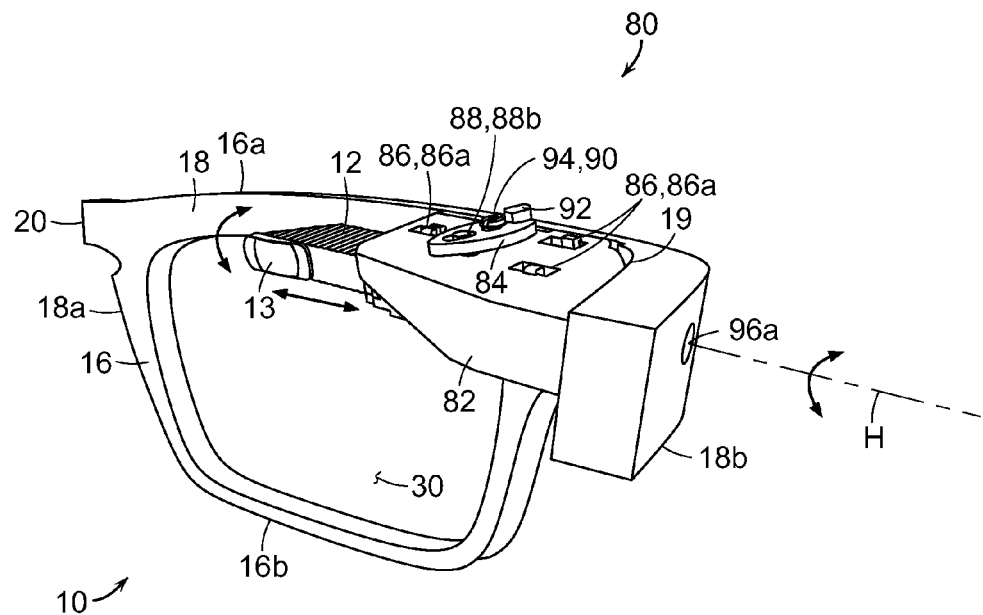
FIG. 17 is a perspective view of a portion of another embodiment of a wearable electronic display in the present invention.
Figure 18:
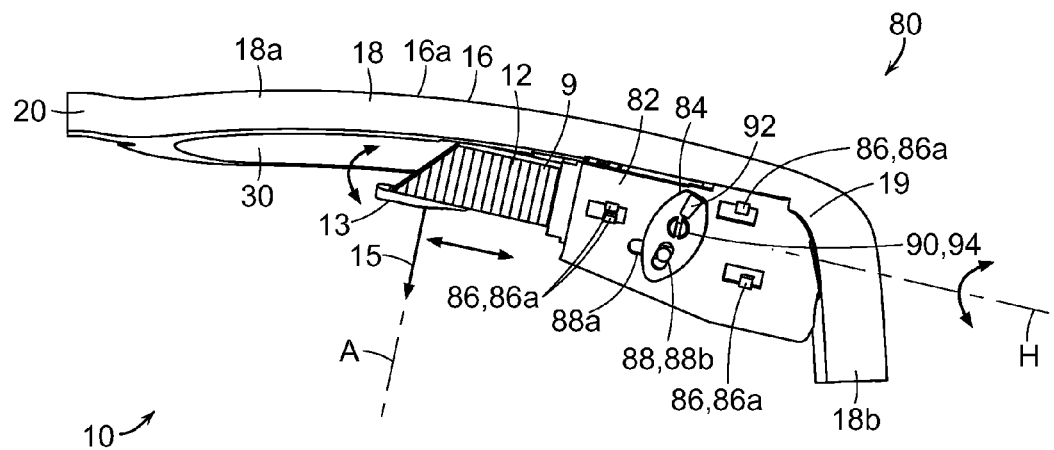
FIG. 18 is a top view thereof.
Figure 19:
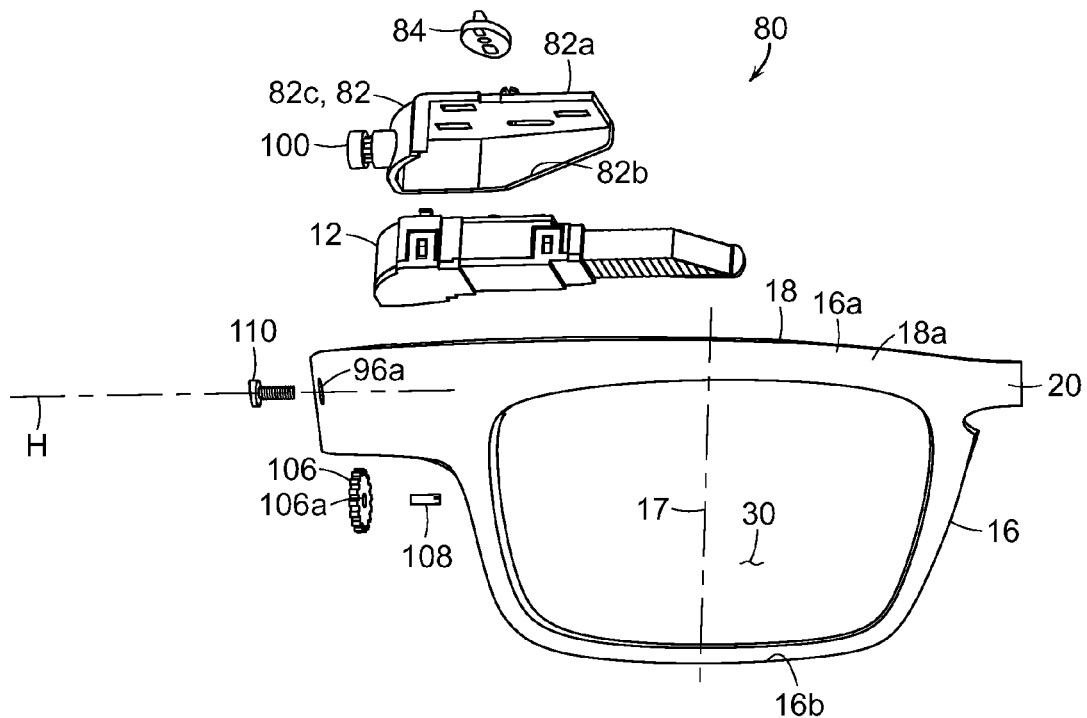
FIGS. 19-22 are exploded views thereof, from front, lower front, side and rear perspective views.
Figure 20:
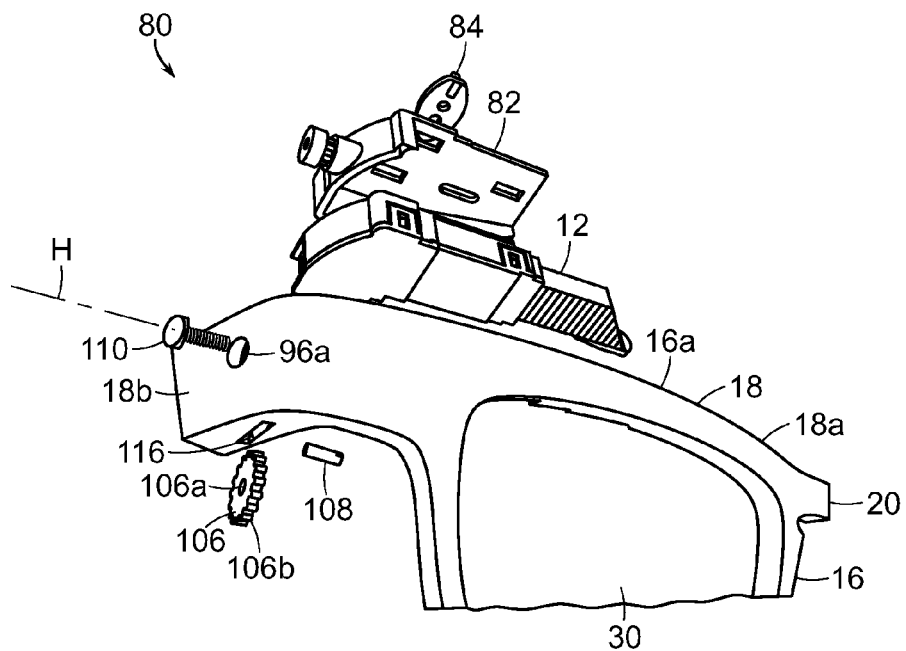
Figure 21:
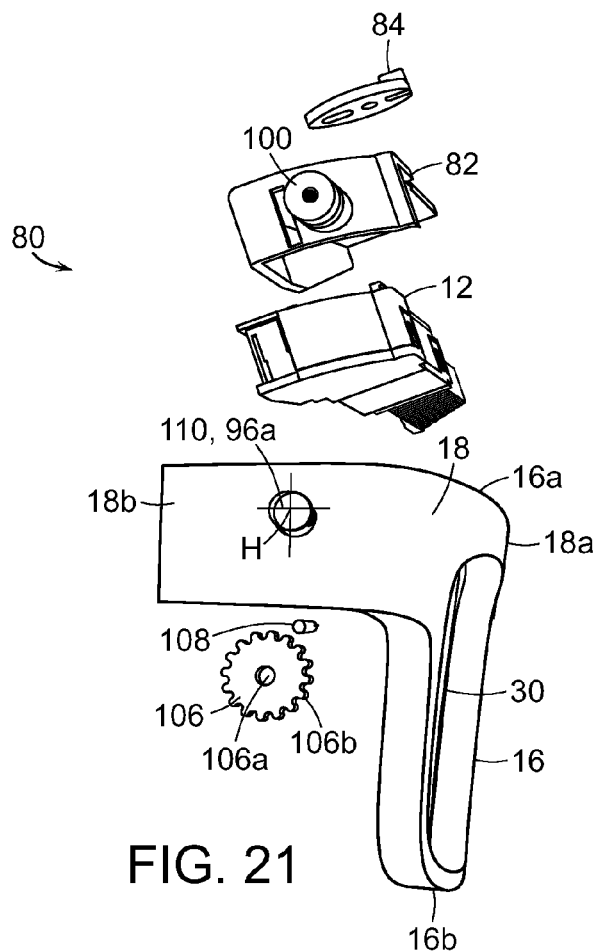
Figure 22:
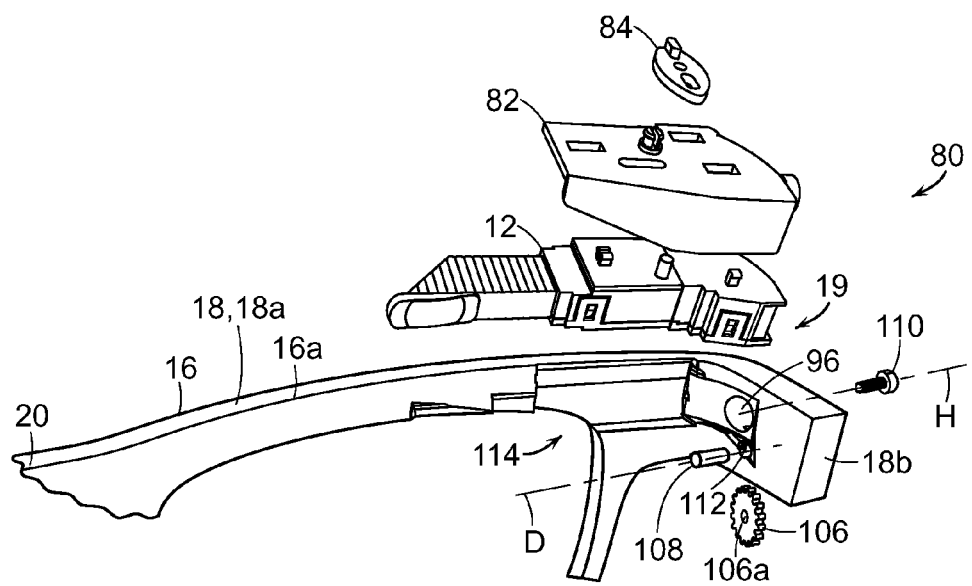

Referring to FIGS. 14-16, in some embodiments such as shown and described in U.S. application Ser. No. 29/462,871, filed Aug. 9, 2013, the entire teachings of which are incorporated herein by reference, the display module can be positioned behind or to the rear of the upper rim or frame portion 16a of a rim 16 of front frame portion 18a in a corner 19. It is possible to connect, fix, or attach a display module 12 to the frame 18 of an existing pair of eyeglasses to form an eyewear electronic display 10. The image exit window 13 can be angled or tilted slightly downwardly to angle or tilt the optical axis A to the user's 24 eye 8. The upper rim portion 16a can be thicker than the elongate portion 9 of the display module 12.

Figure 23:
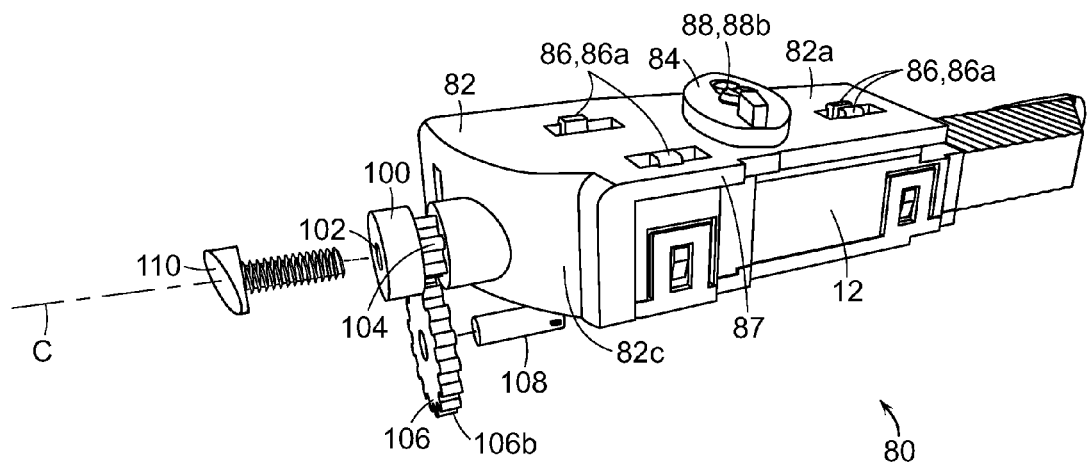
FIG. 23 is a perspective view of an adjustment module.
Figure 24:
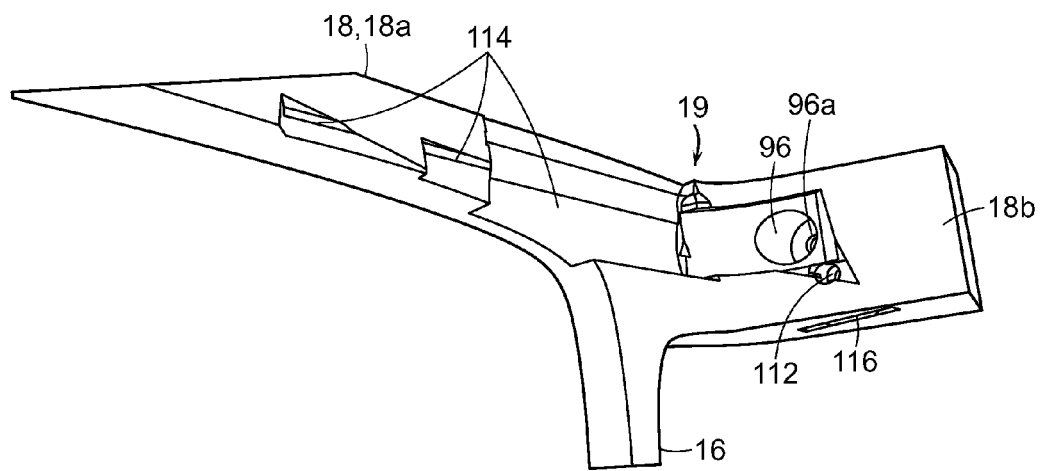
FIG. 24 is a rear perspective view of a portion of the eyewear frame showing a recessed mounting cavity in the rear of the eyewear frame.
Figure 25:
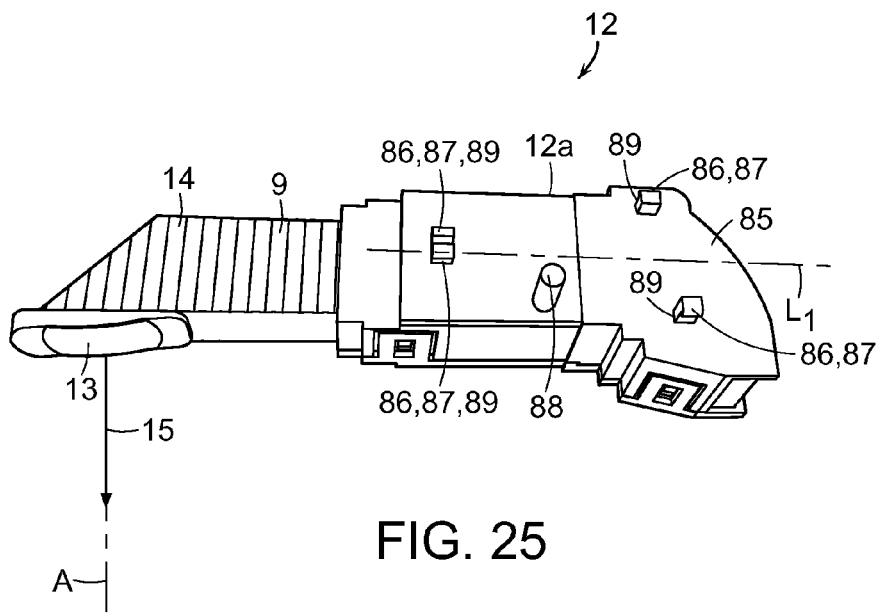
FIG. 25 is a perspective view of an embodiment of a display module.

In another embodiment of a wearable eyewear electronic display 10 in the present invention, the eyewear frame 18 of FIGS. 14-16 can be used with an adjustment mechanism or module 80 containing a display module 12, adjustably mounted to the eyewear frame 18, as seen in FIGS. 17-22. The adjustment module 80 (FIG. 23) can be mounted within an interior corner 19 of the eyewear frame 18 between the front frame portion 18a and the side 18b of the front frame portion 18 and/or side frame portion 26. The corner 19 can be formed within the front frame portion 18a and the side 18b, and can include a clearance or recessed area 114 (FIG. 24) or region extending from the front frame portion 18a to the side 18b to accept and movably mount the adjustment module 80 and display module 12 (FIG. 25). The adjustment module 80 can provide rotational adjustment of the display module 12 about a lateral, transverse or horizontal axis H extending laterally relative to side 18b and/or side frame portion 26 and across the front frame portion 18a, as seen by the rotational arrows. This can rotationally adjust the angle of the exit window 13 of the display module 12 relative to the front frame portion 18a or eyewear rim 16, for example downwardly, to direct images 15 generated by display module 12 along optical axis A to the user's 24 eye 8. The adjustment module 80 can also provide linear horizontal, transverse or lateral adjustment of the display module 12 along the lateral or horizontal axis H as seen by the lateral arrows for laterally adjusting the position of the exit window 13 relative to the front frame portion 18a or eyewear rim 16 for aligning to the eyeball 8, such as for people with different interpupillary distances (IPD), or can be adjusted generally along or to the center 17. The adjustment module 80 can provide rotational and lateral linear adjustment of the display module 12 and exit window 13 within a selected interior corner 19 in a smaller region, package or arrangement than provided by the embodiments shown or described with respect to FIGS. 8-12.

Figure 26:
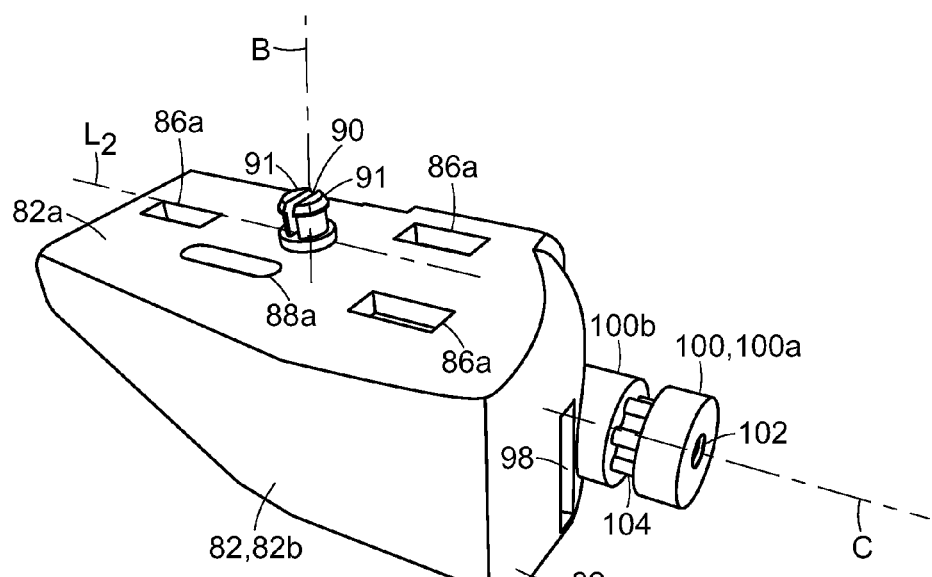
FIG. 26 is a perspective view of an embodiment of an adjustment bracket.
Figure 27:
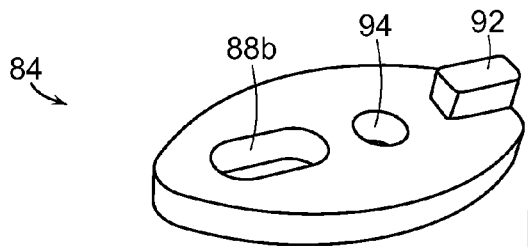
FIG. 27 is a perspective view of an embodiment of a linear adjustment actuator or member.
Figure 28:
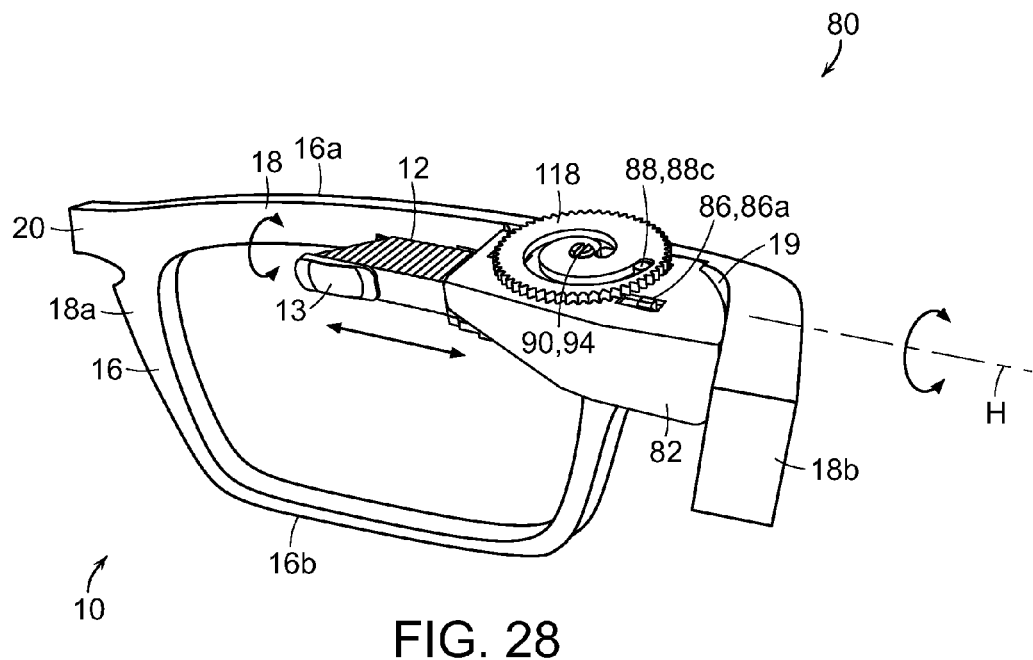
FIG. 28 is a perspective view of a portion of another embodiment of a wearable electronic display in the present invention.
Figure 29:
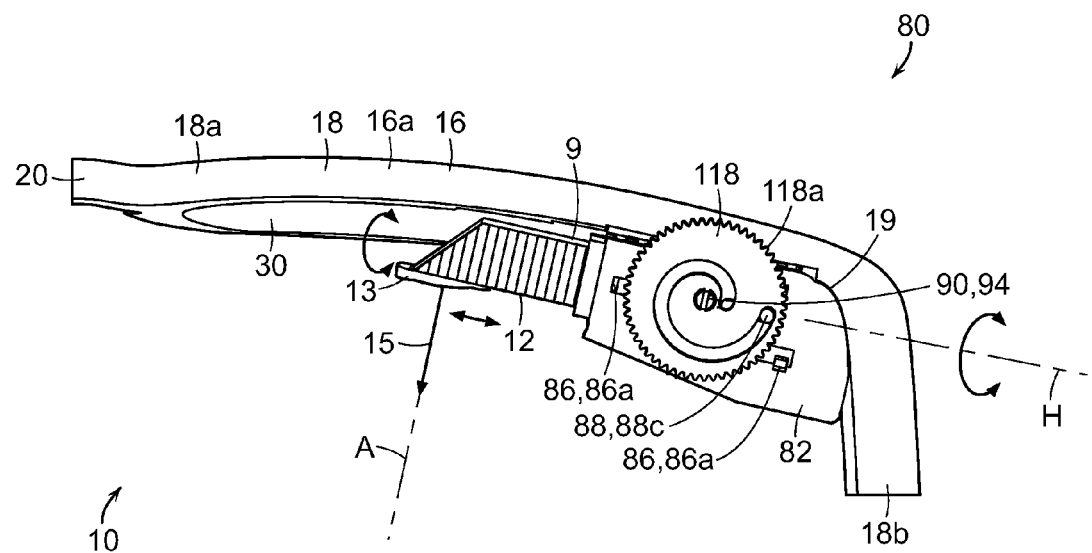
FIG. 29 is a top view thereof.
Figure 30:
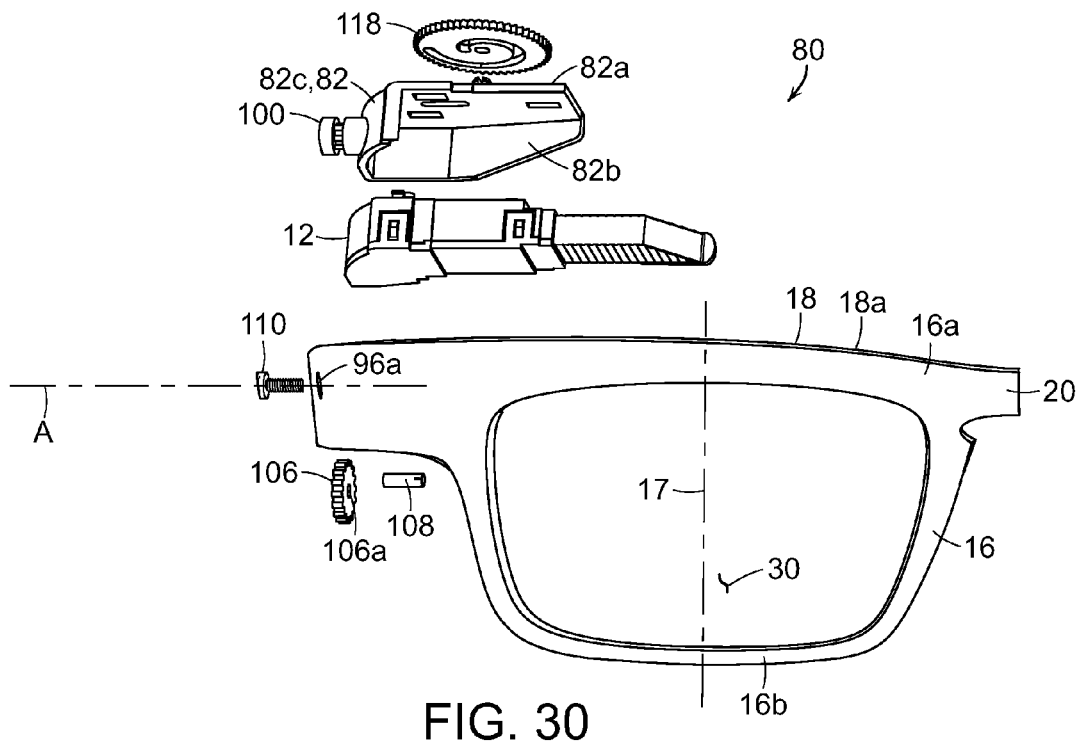
FIGS. 30-33 are exploded views thereof, from front, lower front, side and rear perspective views.
Figure 31:
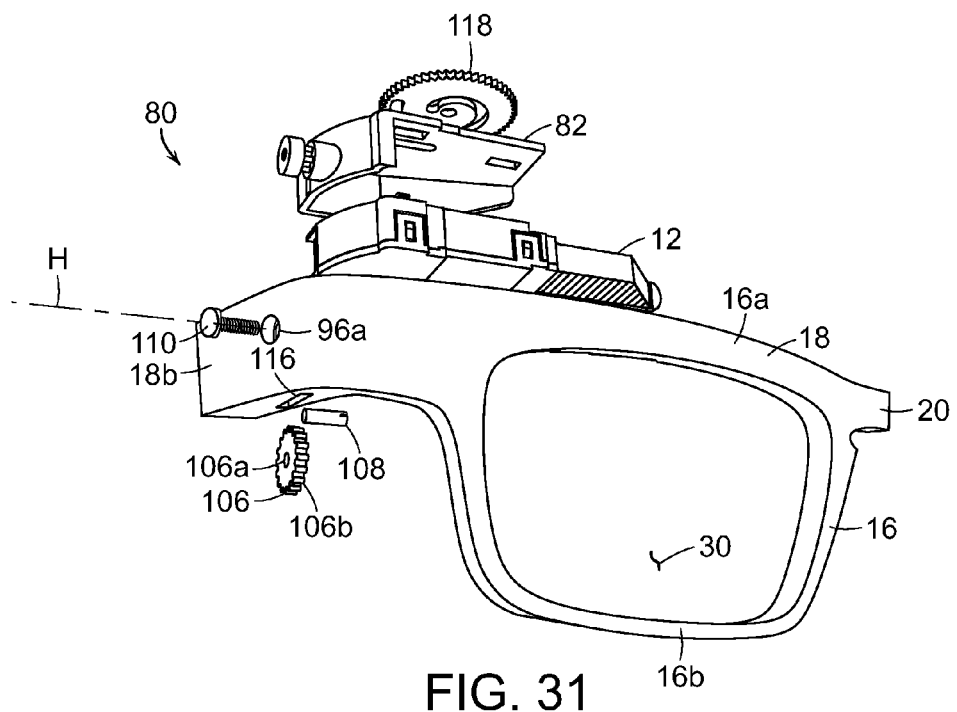
Figure 32:
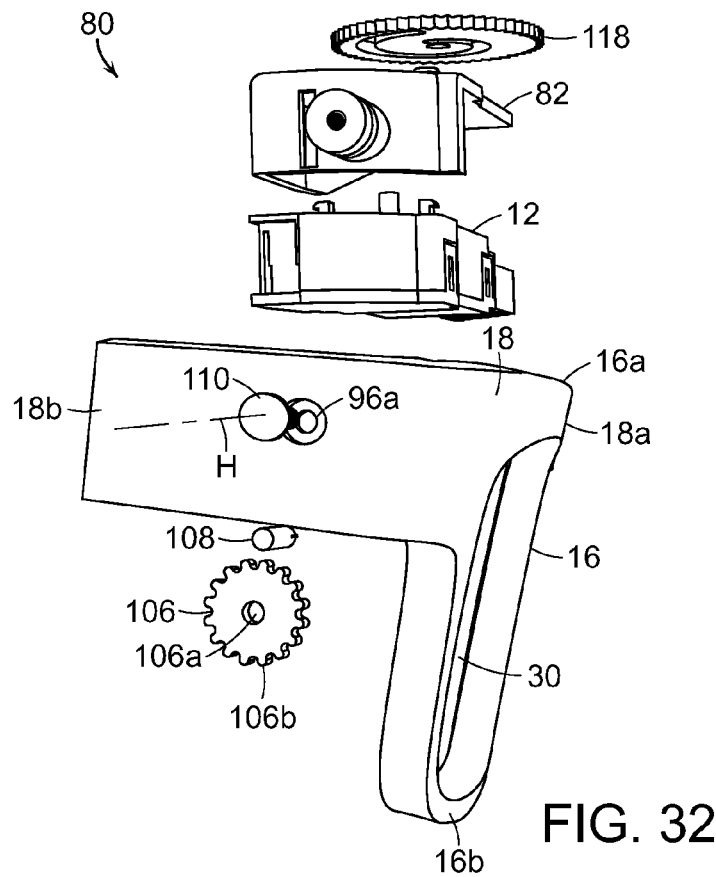
Figure 33:
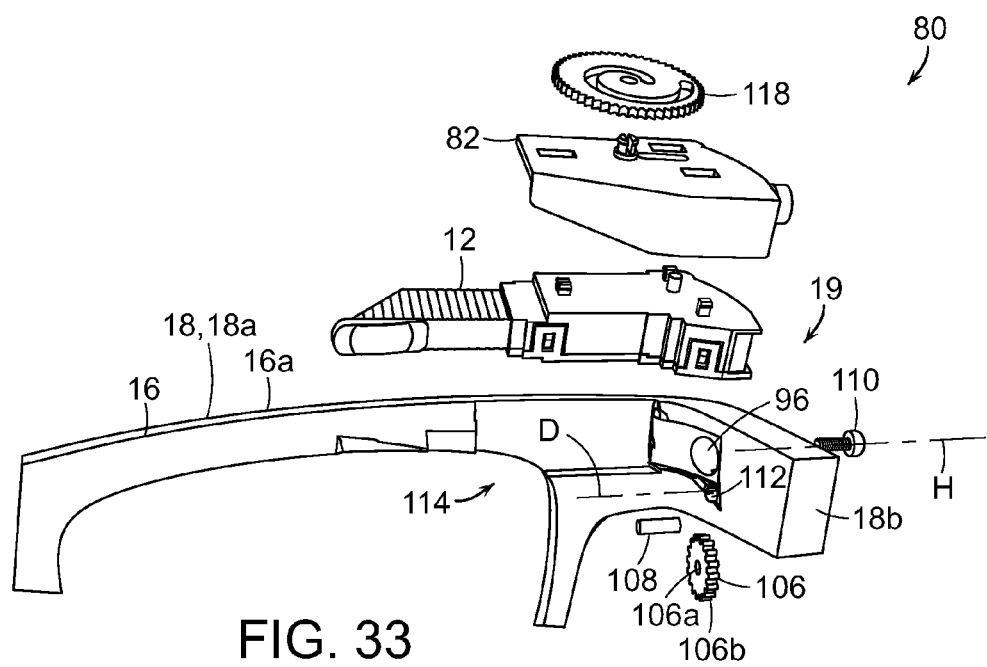
Figure 34:
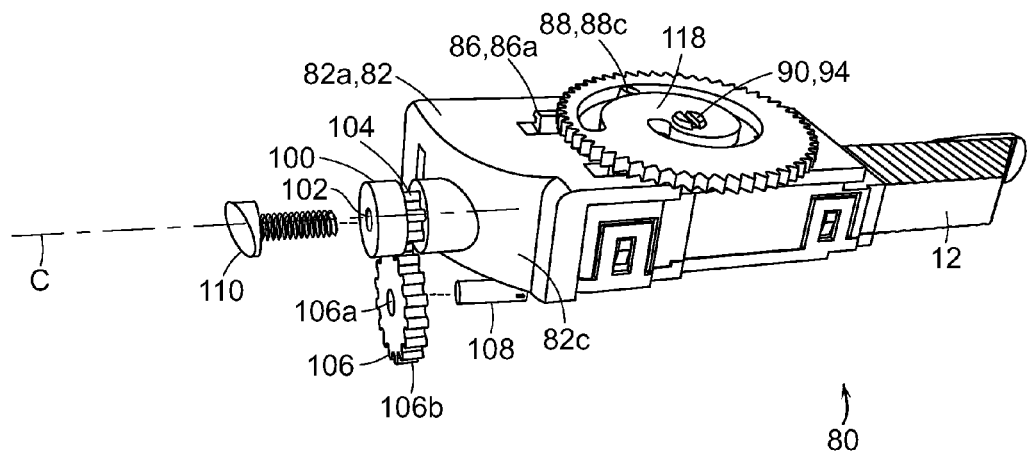
FIG. 34 is a perspective view of another adjustment module.
Figure 35:
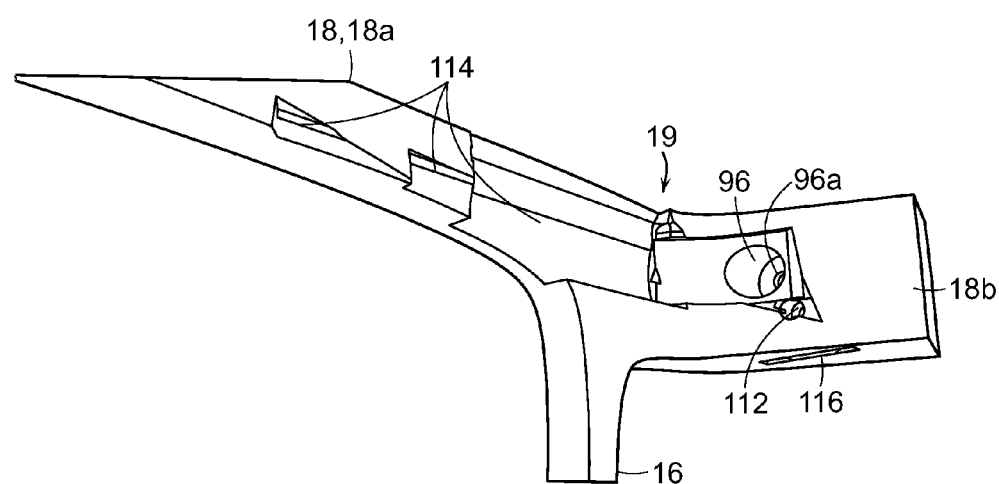
FIG. 35 is a rear perspective view of a portion of the eyewear frame showing a recessed mounting cavity in the rear of the eyewear frame.
Figure 36:
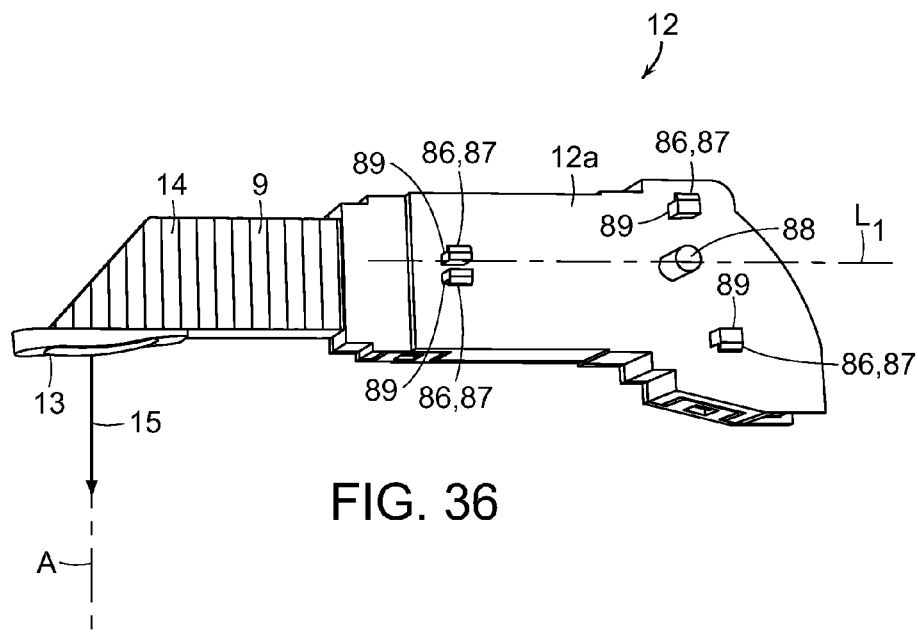
FIG. 36 is a perspective view of another embodiment of a display module.
Figure 37:
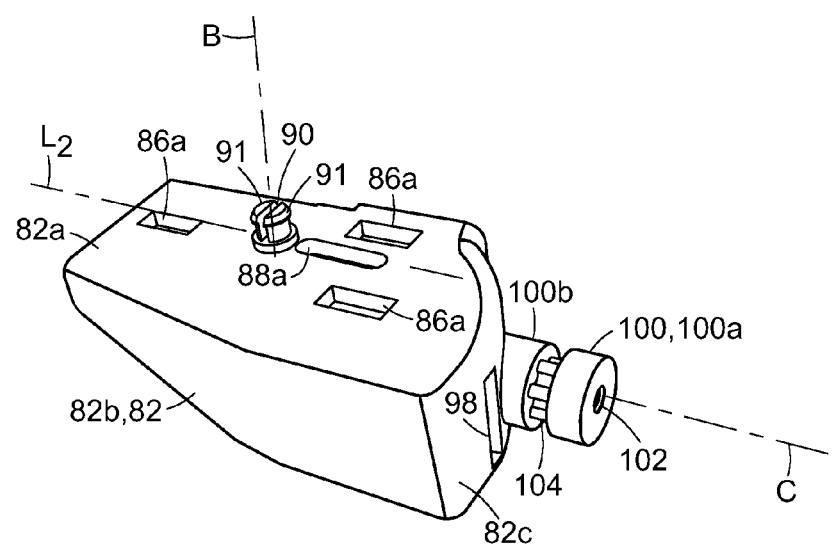
FIG. 37 is a perspective view of another embodiment of an adjustment bracket.
Figure 38:
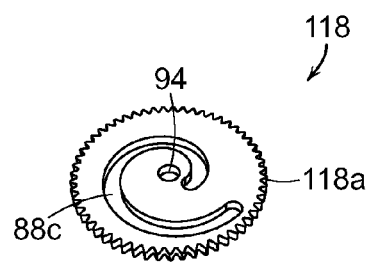
FIG. 38 is a perspective view of another embodiment of a linear adjustment actuator or member.
Figure 39:
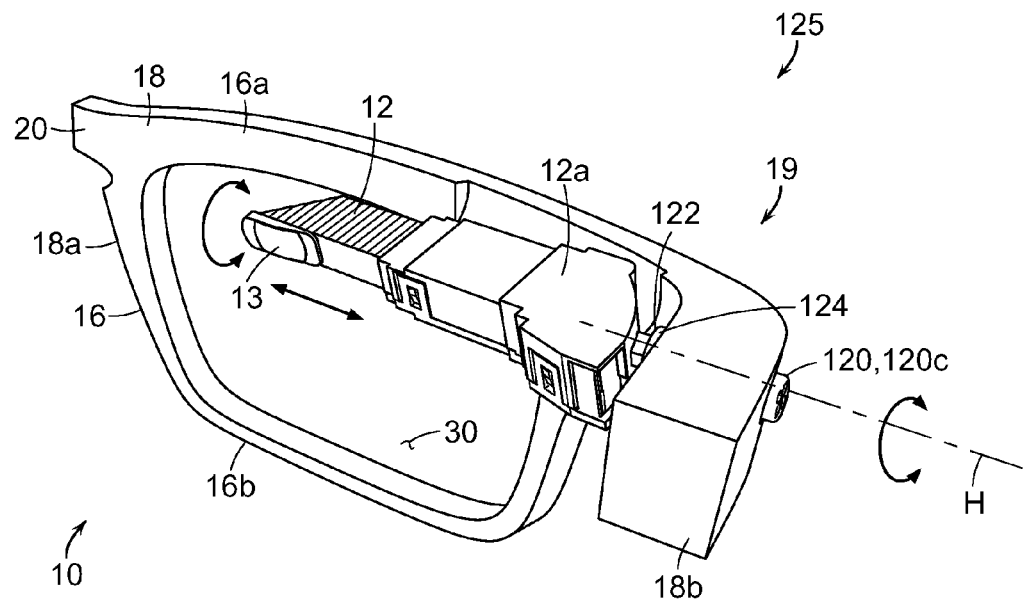
FIG. 39 is a perspective view of a portion of another embodiment of a wearable electronic display in the present invention.
Figure 40:
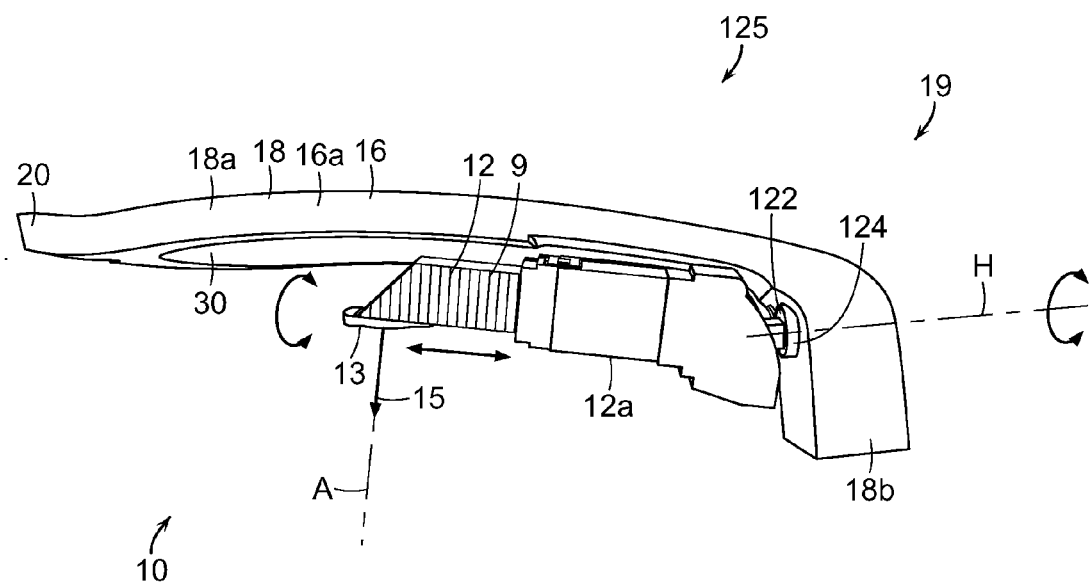
FIG. 40 is a top view thereof.
Figure 41:
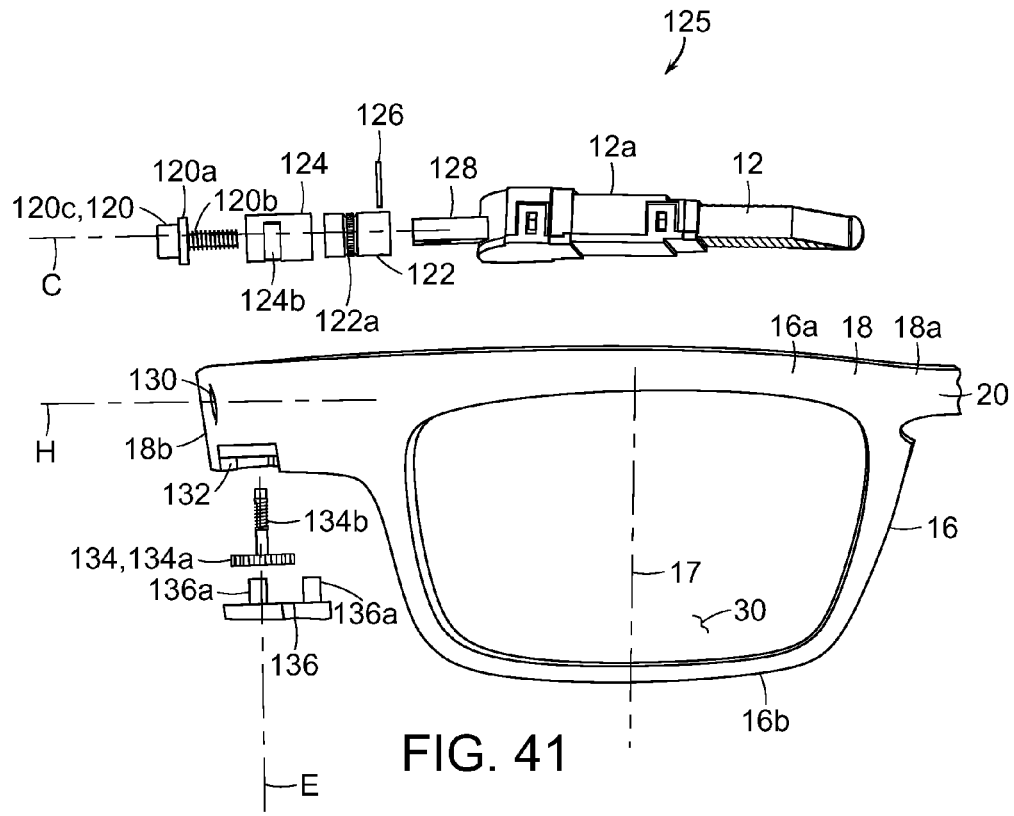
FIGS. 41-44 are exploded views thereof, from front, side, lower front and rear perspective views.
Figure 42:
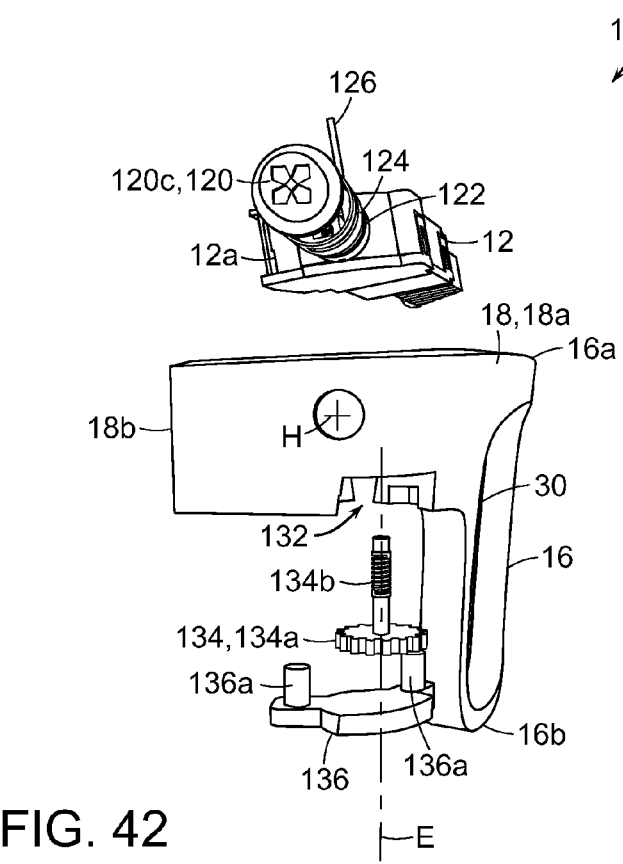
Figure 43:
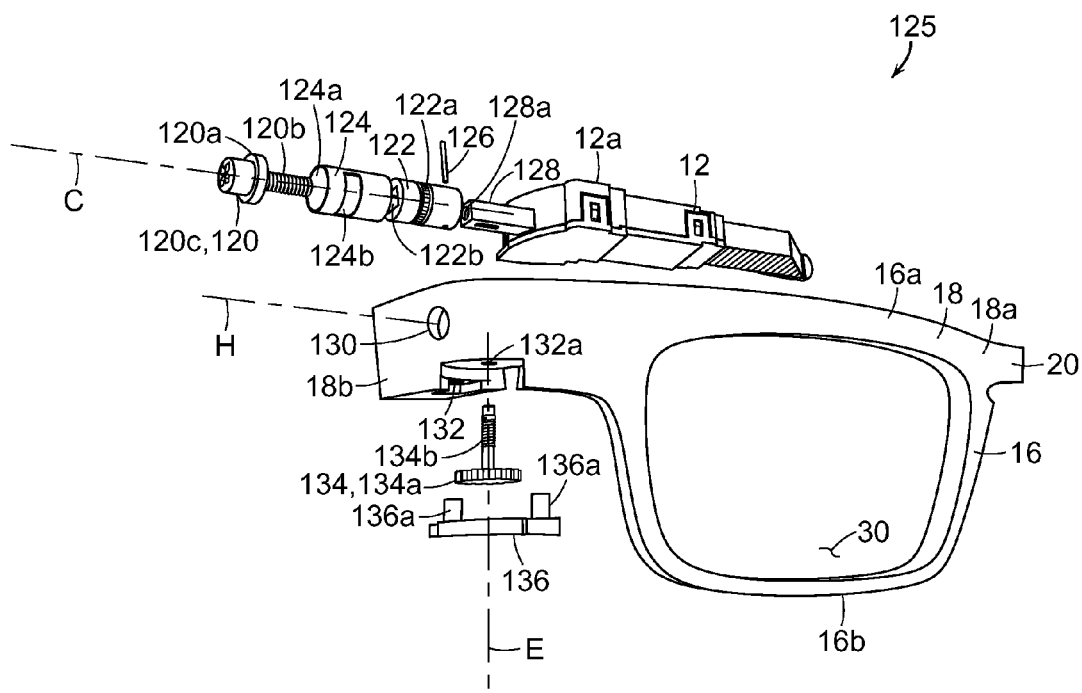
Figure 44:
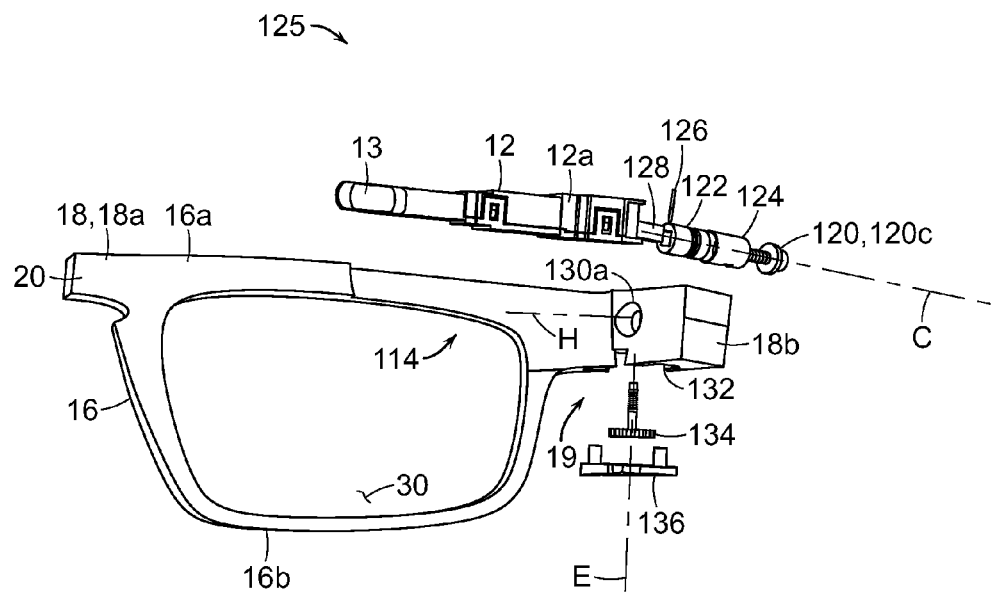

The adjustment module 80 can include a display module 12 (FIG. 25), a rotational or pivotable and linear slide adjustment mounting bracket, housing or shield 82 (FIG. 26) and a rotatable linear adjustment lever, cam, member or actuator 84 (FIG. 27), which can be movably secured to each other, and the adjustment bracket 82 can be rotationally or pivotably mounted to the side 18b of the front frame portion 18a in a corner 19. A rotatable rotational adjustment member or actuator 106 having exterior gear teeth 106b can engage mating gear teeth of a fixed gear 104 extending from the adjustment bracket 82. As a result, the adjustment bracket 82 can be rotationally or pivotably mounted to the eyewear frame 18 about axis H by a rotational mechanism or arrangement, and the display module 12 can be linearly slidably mounted to the adjustment bracket 82 along axis H by a sliding mechanism or arrangement.

With regard to the sliding mechanism, the display module 12 can have a generally flat or planar surface 85, such as a top or upper surface, from which a series of protrusions 86 and 88 can extend, for example five generally upright or vertical protrusions 86 and 88 spaced apart from each other. The surface 85 can slidably engage with or near a mating flat surface of the adjustment bracket 82, such as the interior surface of top wall 82a. The adjustment bracket 82 can have a side wall 82b and an end wall 82c extending downwardly from the top wall 82a for generally surrounding and shielding or protecting a portion of the display module 12. The top wall 82a can have a series of elongate linear guide tracks, channels or slots 86a and 88a oriented along or parallel to longitudinal axis $L_2$ and horizontal axis H, which slidably accept corresponding mating protrusions 86 and 88 for slidably guiding the display module 12 along horizontal axis H. The protrusions 86 can have a lateral securement head 87 for engaging the top or exterior surface of the top wall 82a to slidably secure or trap the top wall 82a of the adjustment bracket 82 to, near or against surface 85 of the display module 12, and a stem 89 for slidably engaging a side of a mating guide track 86a. One longitudinally central guide track 86a on longitudinal axis $L_2$ can be positioned near or along axis $L_2$ or axis H and simultaneously accept two protrusions 86 that are on longitudinal axis $L_1$ having stems 89 which slidably engage opposite sides of the guide track 86a, and two other guide tracks 86a can be linearly spaced therefrom and laterally spaced on opposite sides thereof and axes $L_1$ and $L_2$ which each slidably engage a respective protrusion 86 having stems 89 engaging opposite outer surfaces of the guide tracks 86a, thereby providing lateral stability. Axes $L_1$ and $L_2$ can align with each other and can align with or be parallel to axis H. The protrusions 86 can snap in place in a resilient manner, and can have opposed outward resilient bias. A linear sliding joint can be formed between the display module 12 and the adjustment bracket 82, such as between surface 85 and top wall 82a, and between protrusions 86 and 88 and guide tracks 86a and 88a.

The top wall 82a of the adjustment bracket 82 can have a pivot rod, pin, axle, joint or member 90 extending upwardly along a vertical or upright axis B that is along and can be perpendicular to axis $L_2$. The pivot member 90 can rotatably engage a mating pivot hole or opening 94 in the linear adjustment actuator 84 about axis B for rotatably mounting the linear adjustment actuator 84 to the top wall 82a of the adjustment bracket 82. The pivot member 90 can have two resilient split halves each having a lateral securement head 91 for resiliently snapping into opening 94 and trapping the linear adjustment actuator 84 in place over the top wall 82a. Protrusion 88 extending from display module 12, for example, upwardly laterally offset from axes $L_1$, $L_2$, and B, can be a cylindrical drive or follower pin extending through an elongate linear channel or slot 88a in the top wall 82a of the adjustment bracket 82 and into an elongate linear cam surface, channel or slot 88b within the linear adjustment actuator 84. Slot 88a can be linear and positioned laterally offset from and parallel to axis $L_2$ and in some embodiments, axis H. When linear adjustment actuator 84 is rotated about pivot member 90 and axis B by grasping knob 92, the cam surface of slot 88b can drive the follower pin protrusion 88 linearly laterally in the direction of axes $L_1$, $L_2$ and axis H, back and forth in either direction, depending upon the direction of rotation of the actuator 84, converting rotational motion of actuator 84 into linear motion of protrusion 88 and display module 12. This can drive and move the display module 12 laterally back and forth relative to adjustment bracket 82 along axis H in either direction for adjusting the lateral position of display module 12 and exit window 13 relative to front frame portion 18a. The length of slots 86a, 88a in the adjustment bracket 82, as well as the length of slot 88b in the actuator 84 can be sized to provide a desired range of lateral linear adjustment, and the ends of the slots can act as lateral travel stops from engaging protrusions 86 and/or 88, limiting the range of travel and adjustment to a desired amount. Actuator 84 can be generally oval shaped as shown, or can have other suitable shapes, such as round.

The side wall 82b of the adjustment bracket 82 can act as a shield for the display module 12 and the end wall 82c can have an opening or slot 98 for allowing electrical conductors or cable 7 to extend therethrough. With regards to the rotational mechanism, the adjustment bracket 82 can have a mounting structure 100 extending generally longitudinally from the endwall 82c along an axis C that can be aligned along axes $L_1$, $L_2$ and/or axis H, or parallel thereto. The mounting structure 100 can include a generally cylindrical post and can have a fixed cog or gear 104 positioned adjacent to a distal locating diameter 100a about axis C. A proximal diameter 100b can be positioned on the opposite side of locating diameter 100a from gear 104, and can be connected or fixed to side wall 82c. The mounting structure 100 can include a mounting hole 102 on the end of locating diameter 100a that is positioned along axis C. The locating diameter 100a can engage a mating bore 96 within the recessed area 114 of side 18b of the front frame portion 18a of eyewear frame 18 along axis H, and can be secured in place by a fastener 110 such as a screw through hole or opening 96a in the exterior of side 18b that extends into bore 96 and mounting hole 102 in the locating diameter 100a of adjustment bracket 82, thereby rotatably mounting the adjustment bracket and display module 12 to the eyewear frame 18, which forms a rotating or pivoting joint. The locating diameter 100a and the mating bore 96 can be sized and dimensioned to provide smooth and stable mounting and rotation. The bottom of side 18b can have a slot 116 for accepting or housing a rotatable geared rotational adjustment actuator or wheel 106 that is rotatably mounted or secured within side 18b by a pivot pin, rod, axle or member 108 through hole 106a in wheel 106 and bore 112 within recessed area 114 about an axis D. The adjustment wheel 106 rotates about pivot pin 108 and axis D that is parallel to axis C and axis H in spaced apart fashion, and can have circumferential gear teeth 106b that rotationally engage the teeth of gear 104 on mounting structure 100 of adjustment bracket 82 for adjustably rotating or pivoting the gear 104 and the adjustment bracket 82 about axis C and axis H with engaged gear rotation of gear 104. This can tilt the angle of the exit window 13 and optical axis A in two rotational directions (up/down either direction) for proper adjustment for viewing with eye 8. In some embodiments adjustment actuator 106 does not have to be a wheel, but can be a lever.

Various components for the adjustment bracket 82, actuator 84 or 118, wheel 106 and associated components, can be formed of suitable materials including metals, such as aluminum, or plastics, or combinations thereof. In addition, the adjustment module 80 can be positioned in either left, right or both corners 19. In some embodiments, the adjustment module 80 can be positioned on the lower rim 16b, with an appropriate mounting structure provided for mounting thereto.

FIGS. 28-38 depict another embodiment of a wearable eyewear electronic display 10 that is similar to that shown in FIGS. 17-27, but differs in that the linear adjustment actuator 118 (FIG. 38) can have an elongate spiral or helical cam surface, channel or slot 88c, formed therein, spiraling outwardly relative to central hole 94, for engaging and driving the drive or follower protrusion 88 extending from the display module 12. The spiral slot 88c can be longer than the slot in actuator 84, and can provide a more gradual linear lateral adjustment for the display module 12, converting rotating spiral movement to linear sliding movement of display module 12. The actuator 118 can be a wheel having a circumference with teeth 118a for facilitating rotation by the user's fingers. The pin or protrusion 88 can be positioned longitudinally spaced and in line with the middle twin set of protrusions 86 along axis $L_1$ inline or parallel to axis H, on display module 12 (FIG. 36), and the corresponding slot 88a (FIG. 37) in the top wall 82a of the adjustment bracket 82 can be positioned longitudinally spaced and inline with the slot 86a corresponding to the twin protrusions 86 along axis $L_2$. This arrangement of protrusions 86 and 88 and corresponding slots 86a and 88a is more symmetrical relative to axes $L_1$ and $L_2$ than in the embodiment of FIGS. 17-27, and can provide smooth adjustment movement.

Figure 45:
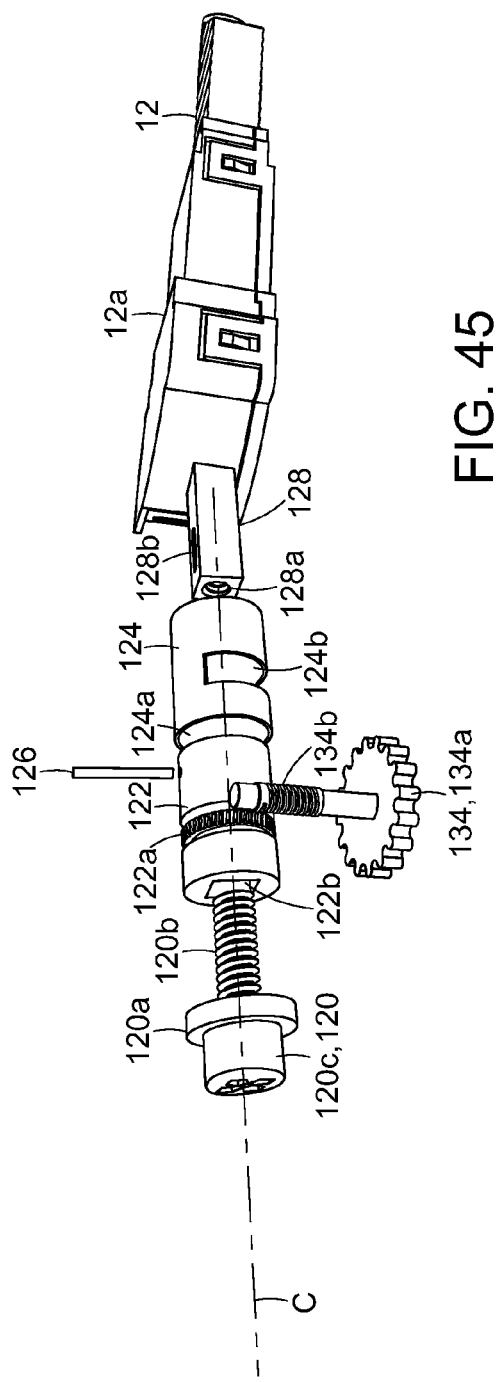
FIG. 45 is an exploded perspective view of an adjustment module in the present invention.

FIGS. 39-44 depict another embodiment of a wearable eyewear electronic display 10 in the present invention which has similarities in some respects to the embodiments shown in FIGS. 17-22 and 28-33. However, an adjustment mechanism or module 125 (FIG. 45) that has some differences can be mounted within an interior corner 19 of the eyewear frame 18 between the front frame portion 18a and the side 18b of the front frame portion 18 and/or side frame portion 26. The adjustment module 125 can include a display module 12 and can provide rotational or pivoting adjustment of the display module 12 about a lateral, transverse or horizontal axis H, and linear horizontal, transverse or lateral slide adjustment of the display module 12 along the lateral, transverse or horizontal axis H, as seen by the arrows, for making adjustments such as described above for FIGS. 17-22.

Figure 46:
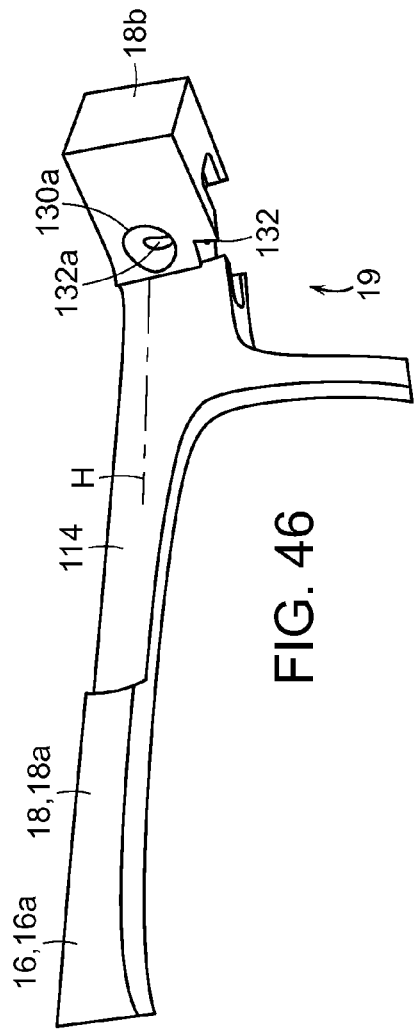
FIG. 46 is a rear perspective view of a portion of the eyewear frame showing a recessed mounting cavity in the rear of the eyewear frame.
Figure 47:
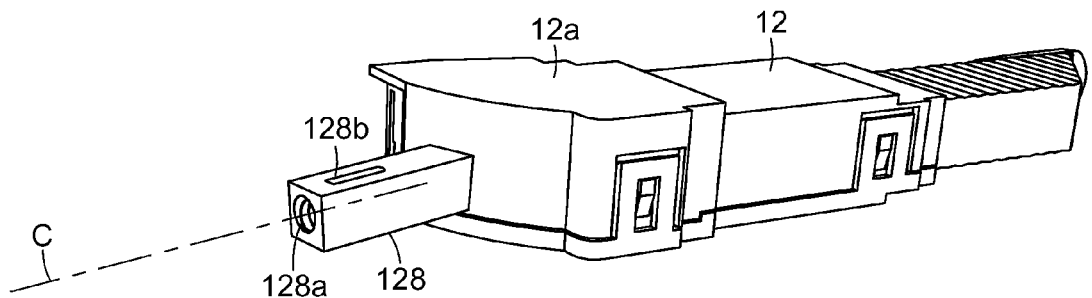
FIG. 47 is a perspective view of an embodiment of a display module having a mounting bracket post slide in the present invention.
Figure 48:
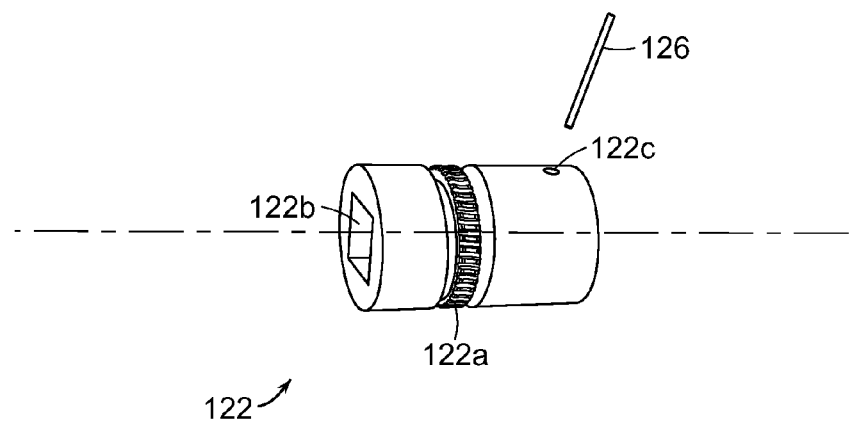
FIG. 48 is a perspective view of an embodiment of a worm gear member in the present invention.
Figure 49:
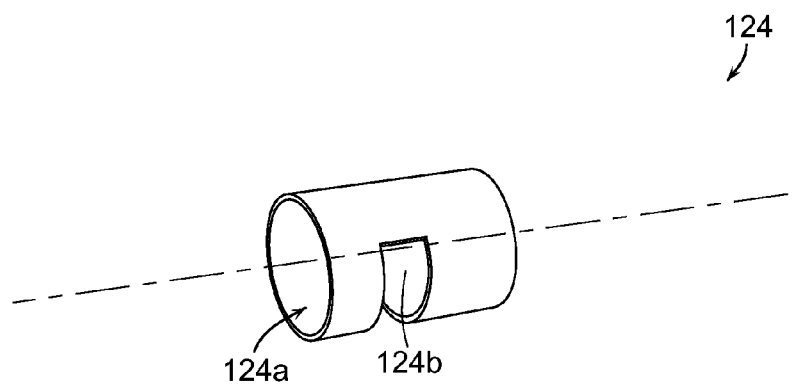
FIG. 49 is a perspective view of an embodiment of a sleeve bearing in the present invention.

The adjustment module 125 can include a display module 12 (FIG. 47) having a mounting structure 128 extending from the housing 12a of the display module 12. The mounting structure 128 can be a generally rectangular slide post structure with a generally rectangular or square cross section that can form a rotational and linear slide adjustment mounting bracket, extending along axis C, and for alignment along or with axis H. The mounting structure 128 and the display module 12 can be rotationally and slidably mounted to or relative to the side 18b of the front frame portion 18a in a corner 19. A threaded rotatable linear IPD adjustment member or actuator 120 such as a threaded screw can extend through a hole or opening 130 in the side 18*b* of eyewear frame 18 along horizontal axis H. The flange 120*a* of the screw 130 can be seated in a counter bore of the hole 130 on the outer side, with the threaded screw portion 120*b* extending through the side 18*b* and the opening, bore or hole portion 130*a* (FIG. 46) on the inner side, passing through the central opening 122*b* of a generally cylindrical worm gear or wheel member 122 (FIG. 48), and rotationally engaging and securing to the mating screw threads 128*a* within the distal end of post structure 128. The worm gear member 122 can include a worm gear or wheel 122*a* having gear teeth located between two cylindrical portions, that becomes mounted about axis C and axis H. A generally cylindrical or tubular bearing or bushing sleeve member 124 with a round central hole 124*a* (FIG. 49) can be closely fitted coaxially around the worm gear member 122 and inserted or seated within hole portion 130*a*. The sleeve member 124 can be rotatably mounted around the worm gear member 122 and/or relative to hole portion 130*a*, as desired, and can provide stabilization for the assembled components. The screw 120 can secure the display module 120, mounting structure 128, worm gear member 122 and sleeve member 124 to the side 18*b* of the eyewear frame 18 along horizontal axis H, forming a rotational or pivot joint about axis H for rotating or pivoting the display module 12 relative to side 18*b* about axis H. Rotational sliding can occur between worm gear member 122 and sleeve member 124 and/or between sleeve member 124 and hole portion 130*a* and/or between screw 120 and worm gear member 122, as desired.

The worm gear member 122 can have a generally rectangular or square hole 122*b* extending longitudinally therethrough for slidably engaging the rectangular or square cross sectional mounting structure 128 along axis H, which can rotationally fix or lock the worm gear member 122 relative to the mounting structure 128. Other suitable mating corresponding shapes that allow sliding while preventing rotation can be used for mounting structure 128 and hole 122*b*, such as oval shapes, keyed shapes, suitable profile cross sections, splines, etc. The worm gear member 122 can have a hole or opening 122*c* lateral to its longitudinal axis for receiving a mechanical stop pin 126 which can extend laterally through the worm gear member 122 into a linear or longitudinal slot, track or channel 128*b* formed within the mounting structure 128 along, in line or in parallel with axes C and H. The length of the channel 128*b* can be sized to engage the stop pin 126 for restricting or controlling the amount that mounting structure 128 can linearly slide and telescope or adjust relative to worm gear member 122. The sleeve member 124 can closely extend over the worm gear member 122 and cover and trap the stop pin 126 in place within worm gear member 122.

Rotation of the knob or head 120*c* of adjustment screw 120 can operate a sliding mechanism and slidably linearly move or drive the mounting structure 128 and the display module 12 laterally along axis H as indicated by the arrows, for adjusting the lateral position of the exit window 13 in either left or right directions relative to front frame portion 18*a* to the extent limited by stop pin 126. Rotational movement of the screw portion 120*b* about axis H while engaging the mating threads 128*a* in mounting structure 128 is converted to linear motion or movement in a gear reduction manner, and can slowly or incrementally extend the mounting structure 128 in the direction away from screw knob or head 120*c*, or towards it, depending upon direction of rotation, telescoping as needed. This can laterally align the optical axis A of exit window 13 with the user's 24 eye 8 and/or the center 17 for IPD adjustment. By using the gear reduction leverage of a threaded screw, the worm gear member 122 can be fitted closely to or around the mounting structure 128 to reduce backlash or wiggling therebetween, while having enough drive force for slidably moving the two parts relative to each other. The sliding mechanism can comprise the adjustment screw 120, side 18*b*, the sleeve member 124, the worm gear member 122, stop pin 126 and the mounting structure or adjustment bracket 128. In some embodiments less components or additional components can be included in the sliding mechanism.

The side 18*b* of eyewear frame 18 can also have a recessed area 114 or cavity for accepting or receiving the display module 12, and can include hole 130*a* in side 18*b*. A recessed area, cavity or region 132 can be formed in the bottom of side 18*b* and can include a generally upright or vertical hole or opening 132*a* extending upwardly therefrom along an upright or vertical axis E perpendicular and offset from axis H to hole 130*a* or into or near the lateral edge or side of hole 130*a*, such as the front edge. The upright hole 132*a* can receive the rotatable geared worm or threaded stem portion 134*b* of a rotatable geared rotational adjustment actuator 134 along axis E. The geared worm 134*b* can extend upwardly from a rotatable wheel portion 134*a* that can have a circumference with knobs or protrusions, to aid turning with thumbs or fingers. A cover 136 having a pair of protrusions 136*a* can snap into mating holes in recessed cavity 132 and cover the recessed cavity 132, rotatably trapping the rotational adjustment actuator 134 within the recessed cavity 132. The outer diameter of the wheel portion 134*a* can extend beyond the surface of side 18*b*, outer and/or inner, for access and rotation by the user 24. The geared worm 134*b* can be positioned offset from the longitudinal axis of the worm gear member 122 and axis H so threads or teeth of the geared worm 134*b* can engage the gear teeth of the worm gear 122*a* in a gear reduction manner. The upright geared worm 134*b* can extend into hole 130*a* and through an access slot 124*b* in the sleeve member 124 in order for the teeth of worm 134*b* to have access to engage the teeth of worm gear 122*a*. The upright geared worm 134*b* can also engage the edges of the slot 124*b* to maintain the axial location or position of sleeve member 124 in a trapped position along axis H. The cylindrical wall thickness of the sleeve member 124 can also position the teeth of the worm gear 122*a* of the worm gear member 122 away from the walls of hole 130*a* to provide sufficient space for worm 134*b* to properly engage worm gear 122*a*.

Consequently rotation of the wheel portion 134*a* of the rotational adjustment actuator 134 about axis E can operate a rotational mechanism where rotation of worm 134*b* about upright axis E is converted by gear tooth engagement with worm gear 122*a* into rotation or pivoting of worm gear member 122 about lateral axis H. Since the rectangular or square hole 122*b* of worm gear member 122 rotationally fixes or locks to the rectangular or square cross sectional shape of the mounting structure or adjustment bracket 128 extending from display module 12 along lateral axis H, rotation of the worm gear member 122 about axis H also rotates or pivots display module 12 about axis H. This allows the user 24 to easily adjust the angle of optical axis A or pantoscopic angle for desired viewing.

By using a screw thread for the lateral linear sliding adjustment of display module along axis H, small accurate lateral adjustments are possible with high leverage. In addition by employing a rotational actuator 134 having a worm 134*b*, a relatively large number of rotations of rotational actuator 134 are needed to rotate or pivot the worm gear 122*a* of the worm gear member 122, due to the high gear reduction nature of a worm gear set. This can provide very accurate or small incremental rotational or pivotal adjustments of the display module 12 about axis H with high torque. The worm 134b can be positioned between two cylindrical portions of the worm gear member 122 that can have a larger diameter than worm gear 122a which can keep the worm gear member 122 positioned in place. In some embodiments, if desired, the sleeve member 124 and worm gear member 122 can telescope. In some embodiments, the sleeve member 124 can be omitted and the worm gear member 122 can be configured for rotatably or pivotally mounting the worm gear member 122 within or to hole 130a, or to the side 18b.

While this invention has been particularly shown and described with references to example embodiments thereof, it will be understood by those skilled in the art that various changes in form and details may be made therein without departing from the scope of the invention encompassed by the appended claims. For example, various features shown and described can be omitted or combined together.

For example, various features of the embodiments shown or disclosed can be omitted or combined together. In addition, although relative direction terms such as horizontal or vertical have been used, this is for descriptive purposes and does not limit the orientation of the present invention or components thereof. The particular components considered to form or to be included in the adjustment mechanism, sliding mechanism and rotational mechanism in the various embodiments, can vary, as desired.

What is claimed is:

1. A wearable electronic display comprising:
   an eyewear frame having a front frame portion connected to a first side frame portion;
   a display module mounted to the eyewear frame within an interior corner between the front frame portion and the first side frame portion, having a micro-display for generating images, the display module having an elongate portion with an image exit window positioned for directing viewable images to a user's eye; and
   an adjustment mechanism extending within the interior corner for adjusting the position of the image exit window, the adjustment mechanism adjustably mounting the display module to the eyewear frame, and providing rotational adjustment about a lateral axis and linear adjustment along the lateral axis of the display module within the interior corner, the lateral axis extending laterally relative to the first side frame portion into the interior corner spaced apart from and adjacent to an interior side of the front frame portion, the adjustment mechanism comprising an adjustment bracket movably mounting the display module to the eyewear frame, the adjustment bracket is rotationally mounted to the eyewear frame about the lateral axis by a rotational mechanism having a lateral pivot on the lateral axis, and the display module is slidably mounted with the adjustment bracket along the lateral axis by a sliding mechanism, the rotational mechanism includes an adjustment gear mounted to the adjustment bracket in a rotationally fixed manner about the lateral axis, rotationally engaging a rotatable geared rotational adjustment actuator, the sliding mechanism includes a series of protrusions extending from the display module and slidably engaging linear guide tracks within the adjustment bracket, a rotatable linear adjustment actuator rotatably mounted to the adjustment bracket has a cam surface for movably engaging at least one of the protrusions for slidably moving the display module back and forth relative to the adjustment bracket along the lateral axis, the linear adjustment actuator includes an elongate slot forming the cam surface.

2. The wearable electronic display of claim 1 in which the eyewear frame has a second side frame portion, and the front frame portion is connected between the first and second side frame portions, the front frame portion having at least one of above eye and below eye frame members.

3. The wearable electronic display of claim 1 in which the front frame portion having at least one above eye frame member, the elongate portion of the display module laterally extends generally along the level of the at least one above eye frame member, and the image exit window is tilted in a downwardly direction for viewing.

4. The wearable electronic display of claim 1 in which the eyewear frame has the configuration of eyeglasses, with the front frame portion having above eye and below eye frame members being upper and lower portions of two eyewear rims, respectively, and the elongate portion of the display module having a similar width and/or thickness as the eyewear rims, while extending laterally generally along the level of the above eye frame members of the eyewear rims with the image exit window being positioned near or at the center of an eyewear rim.

5. The wearable electronic display of claim 1 in which the display module has an angular shaped portion that at least a portion thereof is positioned in the interior corner.

6. The wearable display of claim 1 in which the elongate slot is at least one of a linear and a spiral slot.

7. A method of viewing images comprising:
   wearing a wearable electronic display, the wearable electronic display having an eyewear frame with a front frame portion connected to a first side frame portion worn by a user, a display module being mounted to the eyewear frame within an interior corner between the front frame portion and the first side frame portion and having a micro-display for generating images;
   directing viewable images to an eye of the user from an image exit window positioned at an elongate portion of the display module; and
   adjusting the position of the image exit window with an adjustment mechanism extending within the interior corner, the adjustment mechanism adjustably mounting the display module to the eyewear frame, and providing rotational adjustment about a lateral axis and linear adjustment along the lateral axis of the display module within the interior corner, the lateral axis extending laterally relative to the first side frame portion into the interior corner spaced apart from and adjacent to an interior side of the front frame portion, the adjustment mechanism comprising an adjustment bracket movably mounting the display module to the eyewear frame, the adjustment bracket is rotationally mounted to the eyewear frame about the lateral axis by a rotational mechanism having a lateral pivot on the lateral axis, and the display module is slidably mounted with the adjustment bracket along the lateral axis by a sliding mechanism, the rotational mechanism includes an adjustment gear mounted to the adjustment bracket in a rotationally fixed manner about the lateral axis, rotationally engaging a rotatable geared rotational adjustment actuator, the sliding mechanism includes a series of protrusions extending from the display module and slidably engaging linear guide tracks within the adjustment bracket, a rotatable linear adjustment actuator rotatably mounted to the adjustment bracket has a cam surface for movably engaging at least one of the protrusions for slidably moving the display module back and forth relative to the adjustment bracket along the lateral axis, the linear adjustment actuator includes an elongate slot forming the cam surface.

8. The method of claim 7 further comprising providing the eyewear frame with a second side frame portion, and the front frame portion is connected between the first and second side frame portions, the front frame portion having at least one of above eye and below eye frame members.

9. The method of claim 7 further comprising:
providing the front frame portion with at least one above eye frame member;
laterally extending the elongate portion of the display module generally along the level of the at least one above eye frame member; and
tilting the image exit window in one of upwardly or downwardly directions for viewing by the eye of the user.

10. The method of claim 7 further comprising:
providing the eyewear frame with the configuration of eyeglasses, and the front frame portion having above eye and below eye frame members being upper and lower portions of two eyewear rims, respectively; and
providing the elongate portion of the display module with a similar width and/or thickness as the eyewear rims, and extending the elongate portion of the display module laterally generally along the level of the above eye frame members of the eyewear rims with the image exit window being positioned near or at the center of an eyewear rim.

11. The method of claim 7 further comprising providing the display module with an angular shaped portion, and positioning at least a portion thereof in the interior corner.

12. The method of claim 7 further comprising forming the elongate slot as at least one of a linear and spiral slot.

13. A wearable electronic display comprising:
an eyewear frame having a first side frame portion;
a display module mounted to the eyewear frame having a micro-display for generating images, the display module having an elongate portion with an image exit window positioned for directing viewable images to a user's eye; and
an adjustment mechanism for adjusting the position of the image exit window, the adjustment mechanism adjustably mounts the display module to the eyewear frame, providing rotational adjustment about a lateral axis, and linear adjustment along the lateral axis, the adjustment mechanism comprising an adjustment bracket movably mounting the display module to the eyewear frame, the adjustment bracket is rotationally mounted to the eyewear frame about the lateral axis by a rotational mechanism having a lateral pivot on the lateral axis, and the display module is slidably mounted with the adjustment bracket along the lateral axis by a sliding mechanism, the rotational mechanism includes an adjustment gear mounted to the adjustment bracket in a rotationally fixed manner about the lateral axis, rotationally engaging a rotatable geared rotational adjustment actuator, the rotationally fixed adjustment gear is a worm gear, and the rotatable geared rotational adjustment actuator is a worm that is rotatably mounted to the eyewear frame about an axis offset and perpendicular to the lateral axis, the adjustment bracket comprising a post structure extending from the display module, the worm gear being slidably mounted to the adjustment bracket along the lateral axis while being rotationally fixed relative to the adjustment bracket, the worm gear being rotatably mounted about the lateral axis to the eyewear frame, and an adjustment screw linear adjustment actuator extends through the eyewear frame along the lateral axis through the worm gear to rotatably engage mating threads on the adjustment bracket, forming the sliding mechanism that is adjusted along the lateral axis by the adjustment screw linear adjustment actuator.

14. A wearable electronic display comprising:
an eyewear frame having a first side frame portion;
a display module mounted to the eyewear frame having a micro-display for generating images, the display module having an elongate portion with an image exit window positioned for directing viewable images to a user's eye; and
an adjustment mechanism for adjusting the position of the image exit window, the adjustment mechanism adjustably mounts the display module to the eyewear frame, providing rotational adjustment about a lateral axis, and linear adjustment along the lateral axis, the adjustment mechanism comprising an adjustment bracket movably mounting the display module to the eyewear frame, the adjustment bracket is rotationally mounted to the eyewear frame about the lateral axis by a rotational mechanism having a lateral pivot on the lateral axis, and the display module is slidably mounted with the adjustment bracket along the lateral axis by a sliding mechanism, the rotational mechanism includes an adjustment gear mounted to the adjustment bracket in a rotationally fixed manner about the lateral axis, rotationally engaging a rotatable geared rotational adjustment actuator, the sliding mechanism includes a series of protrusions extending from the display module and slidably engaging linear guide tracks within the adjustment bracket, a rotatable linear adjustment actuator rotatably mounted to the adjustment bracket has a cam surface for movably engaging at least one of the protrusions for slidably moving the display module back and forth relative to the adjustment bracket along the lateral axis, the linear adjustment actuator includes an elongate slot forming the cam surface.

15. The wearable display of claim 14 in which the elongate slot is at least one of a linear and a spiral slot.

16. A method of viewing images comprising:
wearing a wearable electronic display, the wearable electronic display having an eyewear frame with a first side frame portion worn by a user, a display module being mounted to the eyewear frame and having a micro-display for generating images;
directing viewable images to an eye of the user from an image exit window positioned at an elongate portion of the display module; and
adjusting the position of the image exit window with an adjustment mechanism, the adjustment mechanism adjustably mounts the display module to the eyewear frame, providing rotational adjustment about a lateral axis, and linear adjustment along the lateral axis, the adjustment mechanism comprising an adjustment bracket movably mounting the display module to the eyewear frame, the adjustment bracket is rotationally mounted to the eyewear frame about the lateral axis by a rotational mechanism having a lateral pivot on the lateral axis, and the display module is slidably mounted with the adjustment bracket along the lateral axis by a sliding mechanism, the rotational mechanism includes an adjustment gear mounted to the adjustment bracket in a rotationally fixed manner about the lateral axis, rotationally engaging a rotatable geared rotational adjustment actuator, the rotationally fixed adjustment gear is a worm gear, and the rotatable geared rotational adjustment actuator is a worm that is rotatably mounted to the eyewear frame about an axis offset and perpendicular to the lateral axis, the adjustment bracket comprising a post structure extending from the display module, the worm gear being slidably mounted to the adjustment bracket along the lateral axis while being rotationally fixed relative to the adjustment bracket, the worm gear being rotatably mounted about the lateral axis to the eyewear frame, and an adjustment screw linear adjustment actuator extends through the eyewear frame along the lateral axis through the worm gear to rotatably engage mating threads on the adjustment bracket, forming the sliding mechanism that is adjusted along the lateral axis by the adjustment screw linear adjustment actuator.

17. A method of viewing images comprising:

wearing a wearable electronic display, the wearable electronic display having an eyewear frame with a first side frame portion worn by a user, a display module being mounted to the eyewear frame and having a micro-display for generating images;

directing viewable images to an eye of the user from an image exit window positioned at an elongate portion of the display module; and adjusting the position of the image exit window with an adjustment mechanism, the adjustment mechanism adjustably mounts the display module to the eyewear frame, providing rotational adjustment about a lateral axis, and linear adjustment along the lateral axis, the adjustment mechanism comprising an adjustment bracket movably mounting the display module to the eyewear frame, the adjustment bracket is rotationally mounted to the eyewear frame about the lateral axis by a rotational mechanism having a lateral pivot on the lateral axis, and the display module is slidably mounted with the adjustment bracket along the lateral axis by a sliding mechanism, the rotational mechanism includes an adjustment gear mounted to the adjustment bracket in a rotationally fixed manner about the lateral axis, rotationally engaging a rotatable geared rotational adjustment actuator, the sliding mechanism includes a series of protrusions extending from the display module and slidably engaging linear guide tracks within the adjustment bracket, a rotatable linear adjustment actuator rotatably mounted to the adjustment bracket has a cam surface for movably engaging at least one of the protrusions for slidably moving the display module back and forth relative to the adjustment bracket along the lateral axis, the linear adjustment actuator includes an elongate slot forming the cam surface.

18. The method of claim 17 further comprising forming the elongate slot as at least one of a linear and spiral slot.

19. A wearable electronic display comprising:

an eyewear frame having a front frame portion connected to a first side frame portion;

a display module mounted to the eyewear frame within an interior corner between the front frame portion and the first side frame portion, having a micro-display for generating images, the display module having an elongate portion with an image exit window positioned for directing viewable images to a user's eye; and an adjustment mechanism extending within the interior corner for adjusting the position of the image exit window, the adjustment mechanism adjustably mounting the display module to the eyewear frame, and providing rotational adjustment about a lateral axis and linear adjustment along the lateral axis of the display module within the interior corner, the lateral axis extending laterally relative to the first side frame portion into the interior corner spaced apart from and adjacent to an interior side of the front frame portion, the adjustment mechanism comprising an adjustment bracket movably mounting the display module to the eyewear frame, the adjustment bracket is rotationally mounted to the eyewear frame about the lateral axis by a rotational mechanism having a lateral pivot on the lateral axis, and the display module is slidably mounted with the adjustment bracket along the lateral axis by a sliding mechanism, the rotational mechanism includes an adjustment gear mounted to the adjustment bracket in a rotationally fixed manner about the lateral axis, rotationally engaging a rotatable geared rotational adjustment actuator, the rotationally fixed adjustment gear is a worm gear, and the rotatable geared rotational adjustment actuator is a worm that is rotatably mounted to the eyewear frame about an axis offset and perpendicular to the lateral axis, the adjustment bracket comprising a post structure extending from the display module, the worm gear being slidably mounted to the adjustment bracket along the lateral axis while being rotationally fixed relative to the adjustment bracket, the worm gear being rotatably mounted about the lateral axis to the eyewear frame, and an adjustment screw linear adjustment actuator extends through the eyewear frame along the lateral axis through the worm gear to rotatably engage mating threads on the adjustment bracket, forming the sliding mechanism that is adjusted along the lateral axis by the adjustment screw linear adjustment actuator.

20. A method of viewing images comprising:

wearing a wearable electronic display, the wearable electronic display having an eyewear frame with a front frame portion connected to a first side frame portion worn by a user, a display module being mounted to the eyewear frame within an interior corner between the front frame portion and the first side frame portion and having a micro-display for generating images;

directing viewable images to an eye of the user from an image exit window positioned at an elongate portion of the display module; and adjusting the position of the image exit window with an adjustment mechanism extending within the interior corner, the adjustment mechanism adjustably mounting the display module to the eyewear frame, and providing rotational adjustment about a lateral axis and linear adjustment along the lateral axis of the display module within the interior corner, the lateral axis extending laterally relative to the first side frame portion into the interior corner spaced apart from and adjacent to an interior side of the front frame portion, the adjustment mechanism comprising an adjustment bracket movably mounting the display module to the eyewear frame, the adjustment bracket is rotationally mounted to the eyewear frame about the lateral axis by a rotational mechanism having a lateral pivot on the lateral axis, and the display module is slidably mounted with the adjustment bracket along the lateral axis by a sliding mechanism, the rotational mechanism includes an adjustment gear mounted to the adjustment bracket in a rotationally fixed manner about the lateral axis, rotationally engaging a rotatable geared rotational adjustment actuator, the rotationally fixed adjustment gear is a worm gear, and the rotatable geared rotational adjustment actuator is a worm that is rotatably mounted to the eyewear frame about an axis offset and perpendicular to the lateral axis, the adjustment bracket comprising a post structure extending from the display module, the worm gear being slidably mounted to the adjustment bracket along the lateral axis while being rotationally fixed relative to the adjustment bracket, the worm gear being rotatably mounted about the lateral axis to the eyewear frame, and an adjustment screw linear adjustment actuator extends through the eyewear frame along the lateral axis through the worm gear to rotatably engage mating threads on the adjustment bracket, forming the sliding mechanism that is adjusted along the lateral axis by the adjustment screw linear adjustment actuator.

\* \* \* \* \*